US008908090B2

(12) United States Patent
Webb

(10) Patent No.: US 8,908,090 B2
(45) Date of Patent: Dec. 9, 2014

(54) METHOD FOR ENABLING MANUAL ADJUSTMENT OF A POINTING DIRECTION OF AN ACTIVELY STABILIZED CAMERA

(71) Applicant: Freefly Systems, Inc., Redmond, WA (US)

(72) Inventor: Steve Webb, Gravesend (GB)

(73) Assignee: Freefly Systems, Inc., Redmond, WA (US)

( * ) Notice: Subject to any disclaimer, the term of this patent is extended or adjusted under 35 U.S.C. 154(b) by 0 days.

(21) Appl. No.: 14/214,517

(22) Filed: Mar. 14, 2014

(65) Prior Publication Data

US 2014/0267805 A1   Sep. 18, 2014

Related U.S. Application Data

(60) Provisional application No. 61/792,878, filed on Mar. 15, 2013.

(51) Int. Cl.
| | |
|---|---|
| H04N 5/225 | (2006.01) |
| H04N 5/232 | (2006.01) |
| G02B 27/64 | (2006.01) |
| B66F 11/04 | (2006.01) |
| F16M 11/18 | (2006.01) |

(52) U.S. Cl.
CPC ......... *H04N 5/2328* (2013.01); *H04N 5/23248* (2013.01); *G02B 27/646* (2013.01); *B66F 11/048* (2013.01); *F16M 11/18* (2013.01); *H04N 5/23258* (2013.01)
USPC ....................................................... 348/373

(58) Field of Classification Search
USPC ....................................................... 348/373
See application file for complete search history.

(56) References Cited

U.S. PATENT DOCUMENTS

| | | | |
|---|---|---|---|
| 5,179,421 | A | 1/1993 | Parker et al. |
| 5,967,458 | A | 10/1999 | Williams et al. |
| 6,867,799 | B2 | 3/2005 | Broemmelsiek |
| 2005/0052531 | A1 | 3/2005 | Kozlov et al. |
| 2005/0206726 | A1 | 9/2005 | Yoshida et al. |
| 2008/0034954 | A1 | 2/2008 | Grober |

(Continued)

FOREIGN PATENT DOCUMENTS

| | | |
|---|---|---|
| DE | 102012203834 B3 | 6/2013 |
| GB | 2036998 A | 7/1980 |

(Continued)

OTHER PUBLICATIONS

"International Search Report & Written Opinion for PCT Application No. PCT/EP2014/055220", Mailed Date: Jun. 10, 2014, Filed Date: Mar. 14, 2014.

*Primary Examiner* — James Hannett

(74) *Attorney, Agent, or Firm* — Saliwanchik, Lloyd & Eisenschenk, P.A.

(57) ABSTRACT

A method for adjusting a pointing direction of a camera housed by an active stabilization system is disclosed. The active stabilization system executes a stabilization process to stabilize the pointing direction of the camera. The method comprises: detecting an externally applied force, disabling the stabilization process upon detecting a manual adjustment condition, adjusting the pointing angle of the camera in a direction of the externally applied force, measuring a current pointing angle of the camera; and re-enabling the stabilization process to stabilize the pointing direction of the camera based on the measured pointing angle of the camera in response to detecting that the detected manual adjustment condition failed.

20 Claims, 15 Drawing Sheets

(56) References Cited

U.S. PATENT DOCUMENTS

| | | |
|---|---|---|
| 2010/0079101 A1* | 4/2010 | Sidman ........................ 318/649 |
| 2010/0110192 A1 | 5/2010 | Johnston et al. |
| 2011/0042459 A1 | 2/2011 | Sullivan et al. |
| 2011/0206124 A1 | 8/2011 | Morphet et al. |
| 2011/0221900 A1 | 9/2011 | Reich |
| 2012/0099851 A1 | 4/2012 | Brown |
| 2012/0120258 A1 | 5/2012 | Boutell et al. |
| 2012/0200722 A1* | 8/2012 | Kozlov et al. .............. 348/208.7 |
| 2012/0263445 A1 | 10/2012 | Beasley |
| 2012/0316685 A1 | 12/2012 | Pettersson |
| 2013/0162852 A1 | 6/2013 | Boyle et al. |

FOREIGN PATENT DOCUMENTS

| | | |
|---|---|---|
| GB | 2089522 A | 6/1982 |
| JP | 2006060459 A | 3/2006 |
| JP | 2007183356 A | 7/2007 |
| JP | 2007271392 A | 10/2007 |
| JP | 2010026271 A | 2/2010 |
| WO | 2012164296 A1 | 12/2012 |
| WO | 2013098288 A1 | 7/2013 |
| WO | 2013181669 A1 | 12/2013 |

* cited by examiner

METHOD FOR ENABLING MANUAL ADJUSTMENT OF A POINTING DIRECTION OF AN ACTIVELY STABILIZED CAMERA

CROSS-REFERENCE TO RELATED APPLICATION

This application claims the benefit of Provisional Patent Application No. 61/792,878, filed on Mar. 15, 2013, which is hereby incorporated by reference herein in its entirety.

FIELD OF THE TECHNOLOGY

The present disclosure relates to stabilization systems, and more particularly to an improved, lightweight, hand-held or vehicle-mounted camera stabilization system for use in photographic or video-related applications.

BACKGROUND

In many applications, it is desirable to stabilize a payload so that it is not affected by vibrations and unwanted movements. This is particularly important in film-production, where any unintentional shaking or movements introduced by, for example, a camera operator can result in footage that is uncomfortable to watch or framed incorrectly.

Passive stabilization mounts have been used to reduce shaking and smooth out movements by using mechanical systems such as springs, shock-absorbers and counterbalances. However, these systems can be large and cumbersome to operate, and typically require a great deal of experience to control effectively. Software-based digital stabilization, as well as optical stabilization exists, but they are typically restricted to correcting small movements.

One technology that is becoming increasingly prevalent is that of active stabilization. The currently available active stabilization systems use motors to counteract any movements detected by motion sensors. Optical gyroscopic sensors, which are sufficiently accurate to detect small vibrations, are typically used in such systems. However, the optical gyroscopic sensors tend to be large and very expensive.

Thus, it is desirable to provide a low-cost, lightweight stabilization system that can effectively remove unwanted movements, while also providing a level of control and flexibility to operators to easily and intuitively capture the footage they require.

SUMMARY

The described embodiments of the invention provide for a method for correcting automatically a pointing angle of an actively stabilized camera to compensate for translational movements of the camera using a combination of velocity, position, and/or distance measurements associated with the translational movements of the camera.

In one embodiment, the present disclosure provides a method of method for adjusting a pointing direction of a camera housed by an active stabilization system, the active stabilization system executing a stabilization process to stabilize the pointing direction of the camera, the method comprising: detecting an externally applied force; disabling the stabilization process upon detecting a manual adjustment condition; adjusting the pointing angle of the camera in a direction of the externally applied force; measuring a pointing angle of the camera; and re-enabling the stabilization process to stabilize the pointing direction of the camera based on the measured pointing angle of the camera in response to detecting that the detected manual adjustment condition failed.

In some example embodiments, the detecting the manual adjustment condition comprises detecting that an unlock-angle trigger is engaged.

In some example embodiments, the manual adjustment condition fails when the unlock-angle trigger is released.

In some example embodiments, the external force is experienced by one of the camera and the active stabilization system.

In some example embodiments, the external force is detected based on one of a control signal issued by the active stabilization system for controlling movement of a motor of the active stabilization system and a measurement obtained by a pressure sensor located on one of the camera and the active stabilization system.

In some example embodiments, the disabling step comprises: disabling an angle-based control loop of the stabilization process.

In some example embodiments, the disabling the angle-based control loop comprises one of: activating a switch to bypass the angle-based control loop update and provide, to a rate-based control loop of the stabilization process, a commanded angular rate equal zero, and setting a commanded pointing angle to match a current pointing angle of the camera, wherein the angle-based control loop derives the commanded angular rate based on differences between the commanded pointing angle and the current pointing angle of the camera.

In some example embodiments, the adjusting step comprises: measuring an angular rate of the camera; and executing a rate-based control loop update of the stabilization process based on the measured angular rate and a zero command angular rate.

In some example embodiments, the method further comprises resetting an integral accumulator of the rate-based control loop.

In some example embodiments, the detecting the manual adjustment condition comprises determining that the external force exceeds a pre-set threshold.

In some example embodiments, the manual adjustment condition fails when the external force falls below the threshold.

In some example embodiments, the detecting the manual adjustment condition comprises determining that the external force exceeds a pre-set threshold, the method further comprising: starting a timer for a pre-defined time period upon determining that the external force exceeds the pre-set threshold; and adjusting the pointing angle of the camera until the pre-defined period expires.

In some example embodiments, the method further comprises: determining, upon expiration of the pre-defined time period, whether the external force continues to be applied; and restarting the timer if the external force continues to be applied.

In some example embodiments, the adjusting step is performed even if the external force falls below the pre-set threshold; and the manual adjustment condition fails when the external force falls below the threshold and the timer stops running.

In some example embodiments, the method is executed for one or more of a pan axis, a tilt axis, and a roll axis, wherein the externally applied force is detected in relation to the one or more axes.

In some example embodiments, as the pointing angle of the camera is being adjusted in the direction of the externally applied force an adjustment rate of the pointing angle increases.

In some example embodiments, the method further comprises: continuing, in response to detecting that the manual adjustment condition failed, to adjust the pointing angle of the camera in the direction of the externally applied force, reducing an adjustment rate of the pointing angle, until the adjustment rate reaches zero, wherein the current pointing angle of the camera is measured when the adjustment rate reaches zero.

In some example embodiments, a system is provided, the system comprising one or more processors, and memory comprising instructions which when executed by the one or more processors causes the system to carry out any of the methods described above.

In some example embodiments, a non-transitory computer-readable medium is provided, the medium storing program instructions for causing a processor to perform any of the methods described above.

In another embodiment, the present disclosure provides an active stabilization system for adjusting a pointing direction of a camera housed by the system, the system executing a stabilization process to stabilize the pointing direction of the camera, the system comprising: an inertial measurement unit configured to measure a pointing angle and an angular rate of the camera; and an active stabilization controller configured to execute the stabilization process for one or more of a pan axis, a tilt axis, and a roll axis; wherein the active stabilization system is configured to perform a method according to any of claims 1 to 15 using the measurements provided by the inertial measurement unit.

In some example embodiments, the active stabilization system is configured to perform the method according to any of any of the methods described above for the pan axis and the tilt axis in parallel.

In some example embodiments, the active stabilization system is further configured to enable a camera operator to pre-select one or more of the pan, tilt, and roll axes for which a manual adjustment of the pointing angle of the camera is enabled.

In some example embodiments, the active stabilization system is further configured to enable a camera operator to adjust one or more of a threshold defining a minimum external force that enables a manual adjustment of the pointing angle and a time period for the manual adjustment, once the external force exceeds the threshold.

BRIEF DESCRIPTION OF DRAWINGS

Examples of the present proposed approach will now be described in detail with reference to the accompanying drawings, in which.

DETAILED DESCRIPTION

Figure 1:
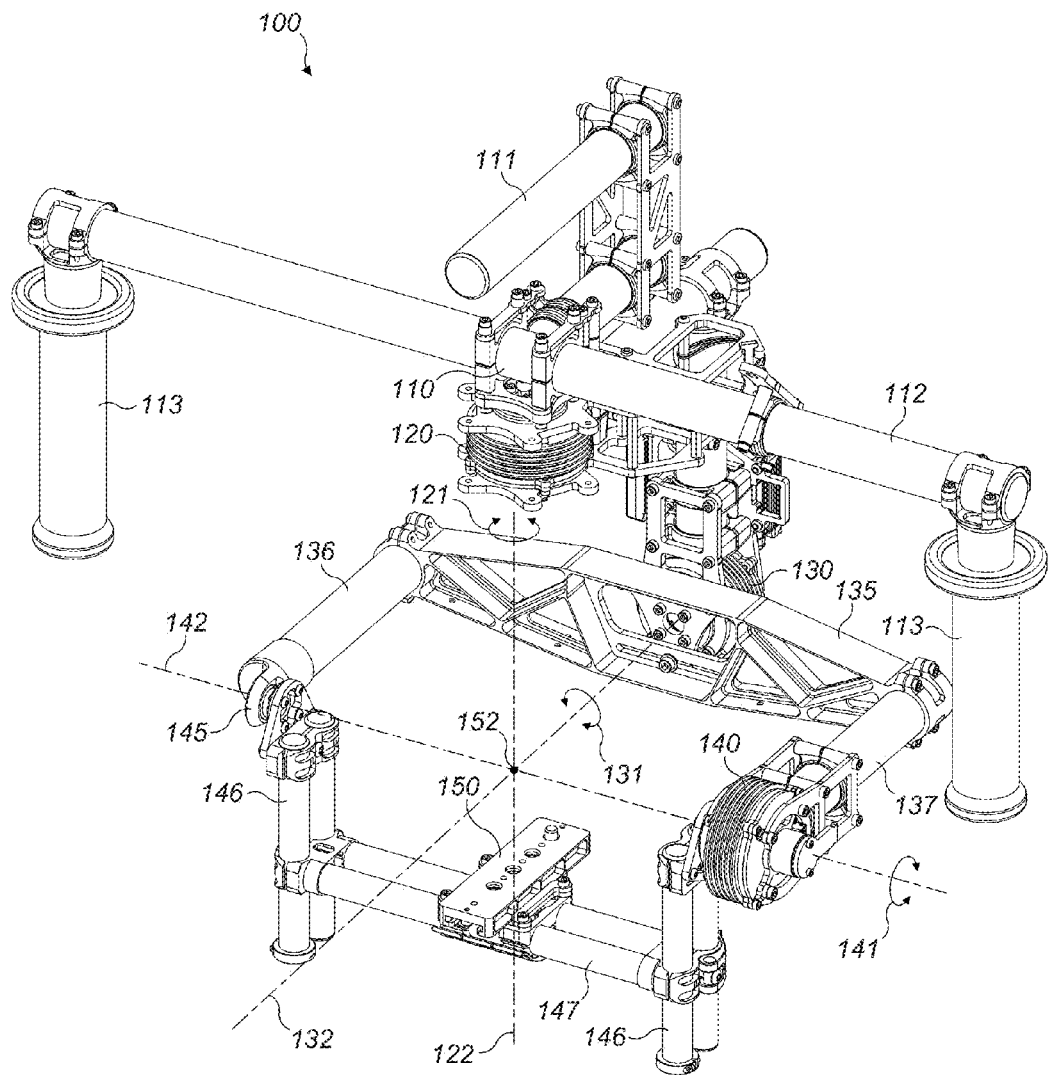
FIG. 1 shows a perspective view of a 3-axis stabilization system for carrying out stabilization techniques in accordance with the present disclosure, according to some embodiments.

FIG. 1 shows a 3-axis camera stabilization system 100, also referred to as a gimbal, according to some embodiments of the present invention. The system 100 includes a support base 110 to which a support frame 112 is attached for manual support and manipulation by an operator. Two handles 113 are attached to the support frame 112 on either side of the support base 110 to allow for two-handed operation of the gimbal 100 and full control over movement of the gimbal 100. A secondary frame 111 is attached to the support base 110 and may be used to attach the overall system 100 to a vehicle or other support or mount. The secondary frame 111 may also be used as a handle for single-handed operation by the operator. Further, peripheral devices may be attached to the secondary frame 111.

The illustrated system 100 is equipped with three motors, a pan axis motor 120, a tilt axis motor 140 and a roll axis motor 130. These motors can provide a rotational input in either direction around the pan 122, tilt 142, and roll 132 axes of the assembly as shown by arrows 121, 131, and 141, respectively. The three motors 120, 130, and 140, when working together, allow a full range of movement of a payload within the gimbal 100. In particular, the pan axis motor 120 is fixed (attached, or otherwise permanently secured, or is removable) to the support base 110 and configured (constructed, designed, or the like) to rotate a structure housing the roll axis motor 120. The roll axis motor 120 is in turn configured to rotate a structure housing the tilt axis motor 140, which is configured to rotate a payload (not shown).

In the illustrated system 100, the roll axis motor 130 rotates a roll beam 135, to which horizontal members 136 and 137 are attached. The tilt axis motor 140 is attached to one horizontal member 137, and its opposing pivot 145 is attached to the other horizontal member 136. The tilt axis motor 140 and the opposing pivot 145 rotate down-tubes 146 along with the cross member 147 attached to the down-tube 146, thereby rotating the payload attached to the cross member 147.

The payload will typically be a camera mounted to the system by a camera mounting arrangement 150. The camera mounting arrangement 150 is generally in the form of a plate, "shoe," or the like, which defines one or more protrusions for engaging with a corresponding recess on a mounting part of the camera. However, various coupling, engaging, and/or fixing means may be provided for securing the camera to the mounting arrangement 150, including but not limited to screw threads, clips, slide and lock mechanisms, and/or the like (not shown).

A point of intersection 152 of the three orthogonal axes 122, 132, and 142 preferably remains generally fixed regardless of the rotation of any of the three motors 120, 130, and 140. In order for a camera mounted in the stabilization system 100 to achieve "passive stability", the center of gravity (COG) of the camera, which varies for different camera designs, should be located at or as near as possible to point 152 where the three orthogonal axes 122, 132, and 142 intersect.

By positioning the camera COG at the intersection point 152, rotational moments applied to the camera by lateral acceleration disturbances of the system are reduced, or even eliminated. Furthermore, the inertia of the payload itself tends to cause the payload to maintain a pointing direction, notwithstanding frictional forces at the axes of rotation. By incorporating these or some other forms of passive stabilization into the arrangement of the system 100, the power draw of active stabilization is kept minimal, particularly when not in motion.

Adjustment means are provided within the stabilization system 100 in order to adjust the COG of a camera mounted to the mounting arrangement 150. For example, in FIG. 1, the mounting arrangement 150 is configured to enable repositioning of a mounted camera relative to each of the orthogonal axes. Centering the COG of the camera, mounted to the mounting arrangement 150, relative to an axis will render the camera "balanced" with respect to that axis. In other words, the camera COG will be at a neutral point relative to that axis, preferably located on the axis, or on a horizontal or vertical plane of the axis. Centering the COG of the camera along each of the orthogonal axes will provide for a balanced camera.

FIG. 1 depicts only an example of a gimbal structure suitable for performing the stabilization techniques described in the present disclosure. The support structures and actuators and their arrangement vary between different embodiments and may change depending on, for example, intended use of the gimbal assembly. For example, the support structures arrangement may be altered to prevent possible obstruction of the payload's view in certain direction(s), adapted to accommodate larger or smaller payloads, and the like.

Figure 2:
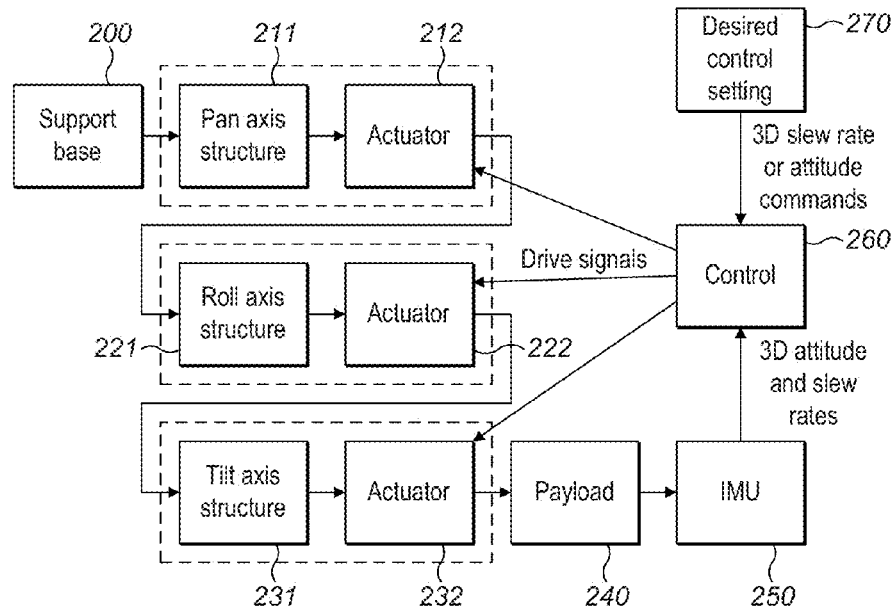
FIG. 2 is a flowchart showing the linkage of top-level elements of a 3-axis stabilization system, according to some embodiments.

FIG. 2 is a flow chart showing how the top level elements of a 3-axis gimbal structure are linked together, according to some embodiments. A support base 200 supports the rest of the gimbal structure and may be mounted to a vehicle, a fixed structure, or held by a camera operator. The support base 200 enables the entire gimbal structure to be moved to different locations during filming, while allowing the other components of the gimbal structure to rotate independently of the moving support base 200. Such an arrangement is particularly useful when camera is being moved while filming a scene.

In the exemplary embodiment of the gimbal structure of FIG. 2, the support base 200 is connected to a pan axis structure 211, which houses a pan axis actuator 212 for rotating the rest of the gimbal structure about a pan axis. Rotations about the pan axis ('panning') are rotations about a vertical axis and within a horizontal plane. In the systems disclosed herein, pan rotations are described relative to the gimbal structure.

The pan axis actuator 212 is connected to a roll axis structure 221 enabling pan rotations of the roll axis structure 221. The roll axis structure 221 houses a roll axis actuator 222 for rotating the rest of the gimbal structure about a roll axis. Rotations about the roll axis ('rolling') are rotations about an axis pointing forward relative to the gimbal structure, and are typically used for rotating the horizon.

The roll axis actuator 222 is connected to a tilt axis structure 231, enabling roll rotations of the tilt axis structure 231. The tilt axis structure 231 may house a tilt axis actuator 232 for rotating the rest of the gimbal structure about a tilt axis. Rotations about a tilt axis ('tilting') are rotations about an axis running horizontally across (left to right) of the gimbal structure, thus allowing rotations up and down relative to the gimbal structure.

The actuators 212, 222, and 232 and the supporting structures 211, 221, and 231 are connected in series to connect to a payload 240. Therefore, rotations by each of these actuators result in a corresponding rotation of the payload 240, thereby allowing full control of the payload's 240 rotations within the gimbal structure. The payload 240 is the object to be stabilized and typically is a camera.

The actuators 212, 222, and 232 are typically motors, but may be any other actuator capable of imparting rotational motion. The actuators could also be linear actuators coupled to cranks, or other mechanisms, for translating linear motion in to rotational motion. The range of rotations of the actuators within the system is preferably, but not necessarily, 360° about each respective axis. If restricted, the range of rotation may be restricted along some or all axes. Further, the range of motion may be limited by physical restrictions of the actuator and/or the surrounding support structure, for example.

The order in which the supporting structures and actuators are linked is not restricted to the order illustrated in FIG. 2 and may vary depending on, for example, an intended use or configuration of the gimbal. In FIG. 1, for example, the pan axis motor 120 is attached to the support base 110, thereby allowing the payload to pan a full 360° range, without the gimbal structure obstructing the view of the payload. However, tilting the payload substantially upward in this configuration may cause the structure to obstruct the view if the payload. Therefore, in the illustrated system 100, pan movements are prioritized over other tilt and roll movements. However, by linking the tilt axis motor to the support base before the pan axis motor instead allows a full range of unobstructed tilt motion.

Furthermore, the specific order of the actuator and axis structure may be rearranged to alleviate complications in wiring and connections. For example, if the support base 210 only comprises a handle, the pan axis actuator 212 could be mounted in the same structure 221 as the roll axis actuator 222, allowing for common wiring of the pan and roll axes actuators to be interlinked and be shorter.

An IMU (inertial measurement unit) 250 is attached to the payload 240 to monitor the motion and pointing direction of the payload 240. The IMU determines the angular position, also referred to herein as the attitude, of the payload. The attitude measurement consists of pitch (tilt), roll and yaw (pan) with respect to a reference frame, which is normally aligned to the Earth's surface. Alternatively, the attitude measurements may be made relative to the support base 200, or an arbitrary reference location and/or direction, for example on a filming set. The measurement of motion, or 'slew,' consists of measuring the rate of change of pitch, roll and yaw in the same axes. The present disclosure sometimes refers to these rates of change as a pitch (tilt) rate, a roll rate, and a yaw (pan) rate.

A control element (controller) 260 processes the attitude and motion measured by the IMU 250 to provide output drive signals in order to operate/actuate the actuators 212, 222, and 232 in closed loop feedback. The control element receives a target (desired) camera orientation from an external source 270. The external source 270 collects data concerning camera operator's intentions and either processes that data to derive the desired camera orientation, e.g., a pointing angle or slew rate, or provides the data to the control element 260 to derive the same. In a single-operator mode, the operator may indicate his or her intentions by manipulating the gimbal handles or using a thumb joystick or other controller on the gimbal. In a dual-operator mode, a remote operator may express his or her intentions using a remote controller that is in communication with the gimbal, e.g., via a radio link.

External disturbances on the pointing angle and/or required motion are compensated by the control loop applying correctional control signals to the actuators. These signals may be acceleration, braking, or reversal of motion by the actuators. The signals may represent a torque command such that a constant value would achieve a constant acceleration of the payload 240 acting against the physical moment of inertia. It is desirable, though not required, for the controller to achieve optimal control without overshoot or delay, while also giving the best speed response (highest control bandwidth). It is preferable for the actuators to be strong and the gimbal structure to be stiff to avoid resonances or flexure within the control bandwidth.

In some embodiments, the gimbal is simplified to fewer than 3 controllable axes. For example, a 2-axis gimbal may be used on a VTOL UAV (vertical take-off and landing unmanned aerial vehicle) as the 3rd pan axis would naturally be provided by the controlled rotation of the airframe.

Figure 3:
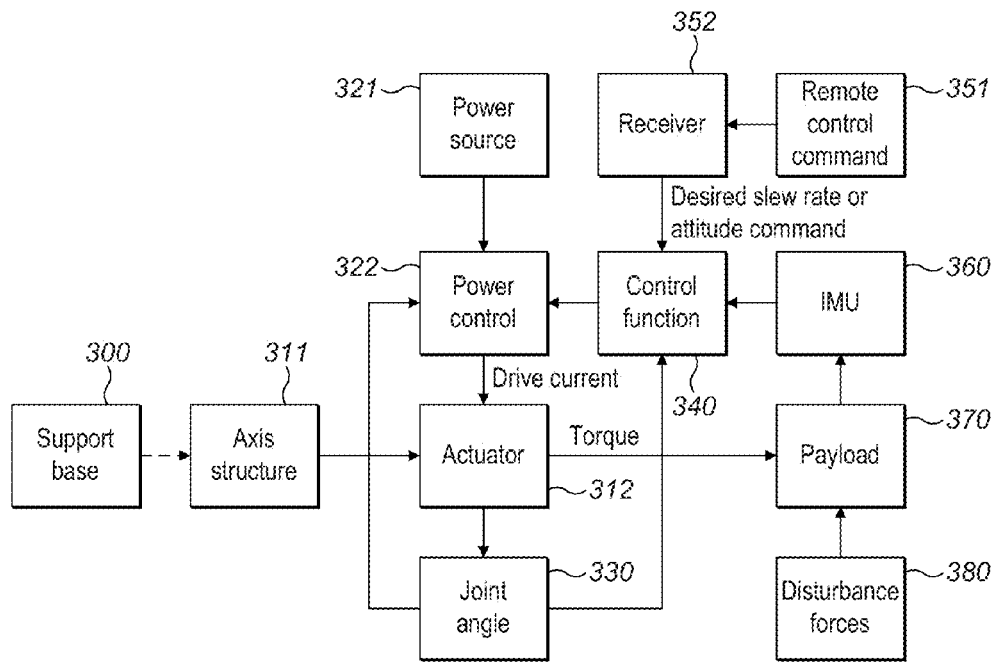
FIG. 3 is a flowchart showing the control elements for a single axis of a stabilization system, according to some embodiments.

FIG. 3 provides a detailed overview of a control system for a single axis. The motion with respect to the other axes in the gimbal is controlled by the same control system of FIG. 3 or a similar control system.

In FIG. 3, a support base 300 is connected either directly to the axis structure 311 or through intermediate elements, such as other axis structures. The axis structure 311 houses an actuator 312, which is coupled to a payload 370 to rotate it about an axis. The coupling of the actuator 312 to the payload 370 may be a direct coupling, such as a shaft, or via intermediate element(s) that are connected directly to the payload 370. The actuator 312 is capable of supplying a rotational torque to be applied to the payload 370 to cause an angular acceleration of the payload 370 dependent on its moment of inertia about the axis.

The control system of FIG. 3 further comprises an element 330 for measuring the joint angle between the actuator and its output shaft. By providing joint angle measurements, the element 330 allows the control system to determine the actual angle between the actuator and the payload to account for frictional torque forces, for example. What particular device(s) form the element 330 varies between different embodiments and includes, but is not limited to, resistive potentiometers, optical shutter wheel encoders, a magnetic Hall resolver, and/or a toothed wheel with a variable reluctance sensor.

In addition the torque forces applied to the payload 370 by the actuator 312, the payload 370 may also experience disturbance forces 380 about the same axis. Such disturbance forces may, for example, arise from friction of the actuator shaft when the support base 300 is rotated. If the payload 370 is not balanced about the axis, the disturbance forces 380 may also arise when the support base 300 is subject to lateral acceleration.

As shown in FIG. 3, the IMU 360 determines the attitude and motion of the payload 370 and outputs respective measurements to a control function 340. The combination of the payload mounted IMU 360 and control function 340 provides means for canceling any disturbance forces 380 and achieving a desired motion and/or constant set attitude with no unwanted disturbances.

In addition to the actual attitude and motion data of the payload 370, the control function 340 also receives a desired motion or pointing command, for example, supplied by a receiver 352, wirelessly communicating with a remote teleoperator via a remote control device 351. The remote operator may slew the gimbal and monitor feedback on a remote image monitor for a filming or sighting application. This allows a dual-operator mode in which one operator carries the gimbal for translational movement and the other operator, i.e., a remote operator, controls the pointing angle of the camera.

Alternatively, or in addition, both the desired motion and pointing command may be instigated by the operator carrying the gimbal using a handles based joystick or rotary knobs, such as a tilt thumbwheel control. In some embodiments, the control system of FIG. 3 uses the relative joint angle measurement 330 to command a slew by monitoring the support base motion. It is also possible for the slew and/or pointing commands to come from an artificial source such as a targeting computer, or a remote IMU that is mounted on another structure such as a monopod, tripod, a person, a vehicle, or the like.

The output of the control function 340 is amplified by a power control block which converts the current from a power source 321 (such as a rechargeable battery) into a form that is compatible with the actuator 312. The power control 322 is preferably regenerative and able to provide braking of the actuator 312 and to recover energy from a moving payload 370, thereby improving efficiency of the power control 322. For example, if a rotational motion is present in one direction and a reversal is required, then the actuator and the power control extract the rotational energy stored in the payload and replenish the power source. In some embodiments, the actuator 312 is accelerated and decelerated with equal capacity and is fully reversible.

Figure 4:
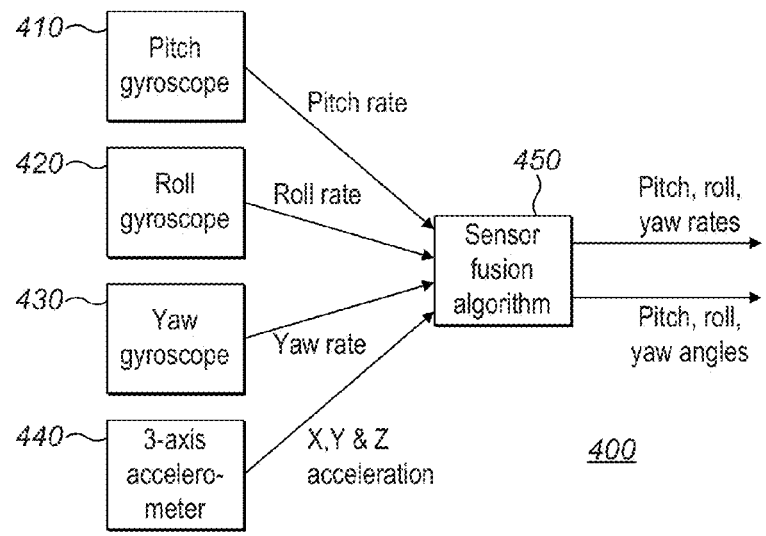
FIG. 4 is a flowchart showing the elements of a basic inertial measurement unit (IMU), according to some embodiments.

FIG. 4 illustrates elements of a basic IMU 400 for determining attitude and motion, according to some embodiments. The simple version of the basic IMU 400 provides only motion as an output, but no attitude measurements (data).

Such a device includes gyroscopes 410, 420, and 430, whose outputs vary according to motion (slew) about their respective orthogonal axes, but no 3-axis accelerometer 440. For resolving the output of the gyroscopes at zero motion an algorithm is employed that averages over a long timescale and assumes short term disturbances, but substantially no movement, over the long timescale. This algorithm forms a high pass filter for subtracting the DC offset that would otherwise be observed at zero motion. The DC offset may change over time, for example, due to differences in the device temperature and ageing.

Optical gyroscopes experience very little drift with zero motion over long timescales. However, they are generally expensive and heavy, and thus may not always be suitable for hand held portable stabilization devices. As an alternative to optical gyroscopes, low cost MEM (micro-electro-mechanical) devices could be used as IMU sensors. MEM devices are fully integrated and contain all management circuitry to run the electronics providing a simple digital or analogue interface. Multiple axes may be detected by a single component, allowing for very compact sensors and IMUs, and thus enabling optimal placement on the payload. However, such low cost MEM devices may encounter drift over time due to differences in temperature and ageing. They also typically have a higher noise (random walk) than the larger, more expensive designs, such as optical gyroscopes.

To include the lower cost/size sensors into the IMU 400 and assure accuracy of the IMU 400, the drift of the lower cost/size sensors needs to be compensated for and updated frequently. For this purpose, in some embodiments, the IMU 400 includes a 3-axis accelerometer 440, which derives pitch and roll attitudes by measuring acceleration with respect to gravity. These attitude measurements are then used to correct the drift of the gyroscopes 410, 420 and 430. In particular, if the accelerometer-derived pitch and roll attitudes are constant, then it is inferred that the respective gyroscopes should be registering the zero rate.

Further, by integrating the angular motion determined from the gyroscopes, the attitude may also be derived from the gyroscopes. More specifically, changes in attitude require an increase and then decrease in angular rate for a move from a starting point to a finishing point. By integrating the curve of the angular rate (usually numerically) a rotation angle can be derived. Integration methods, such as trapezoidal, Runge-Kutta, and Simpsons, may be employed and are used given a required accuracy and/or available processing resources. The integration is performed periodically, at some interval, to commensurate with the overall control loop, for example, at 400-500 Hz. The orientation angle derived by the gyroscope integration is compared to the angle directly resolved by the 3-axis accelerometer which is references to the Earth's gravity. Periodic corrections are applied to minimize the difference between the two measurements.

As a calibrated accelerometer tends to provide more accurate readings over long timescales than drifting gyroscopes, the accelerometer readings are used to correct the gyroscopes' bias and scale. The bias is set as the error in the zero motion case and is used as a constant rotational offset (inferring motion that wasn't happening). The scale is set as the error in the magnitude of gyroscope derived deflection. Thus, it is possible to construct a sensor fusion algorithm 450, for example based on a Kalman filter and Quaternion angle representation, to derive accurate and compensated readings for motion (angular rate) and pointing direction (attitude). Generally speaking, the sensor fusion algorithm 450 takes the high bandwidth readings from the gyroscopes 410, 420, and 430 and calibrates them to increase their accuracy using the lower bandwidth readings from the accelerometer 440. The two types of sensors are complementary and sometimes their combination is done by what is referred to as a complimentary filter. A number of different structures/combinations of the sensors are possible.

As described herein, the IMU 400 is generally capable of deriving sufficiently reliable measurements of motion and attitude through the combination of different types of sensors to provide for a controlled solution. However, although by combining the sensors some of the inaccuracy effects of using cheaper, smaller sensors, are mitigated, further accuracy issues may be introduced during more complex movements. For example, if the gimbal is carried by a moving vehicle turning a corner, the described IMU 400 may mistake the radial acceleration for gravitational acceleration, thereby incorrectly assessing the motion of the payload by introducing a roll motion to the payload. Such incorrect introduction of the roll motion to the payload is undesirable particularly because deviations of the horizon from the horizontal line are easily noticeable in cinematography.

Figure 5:
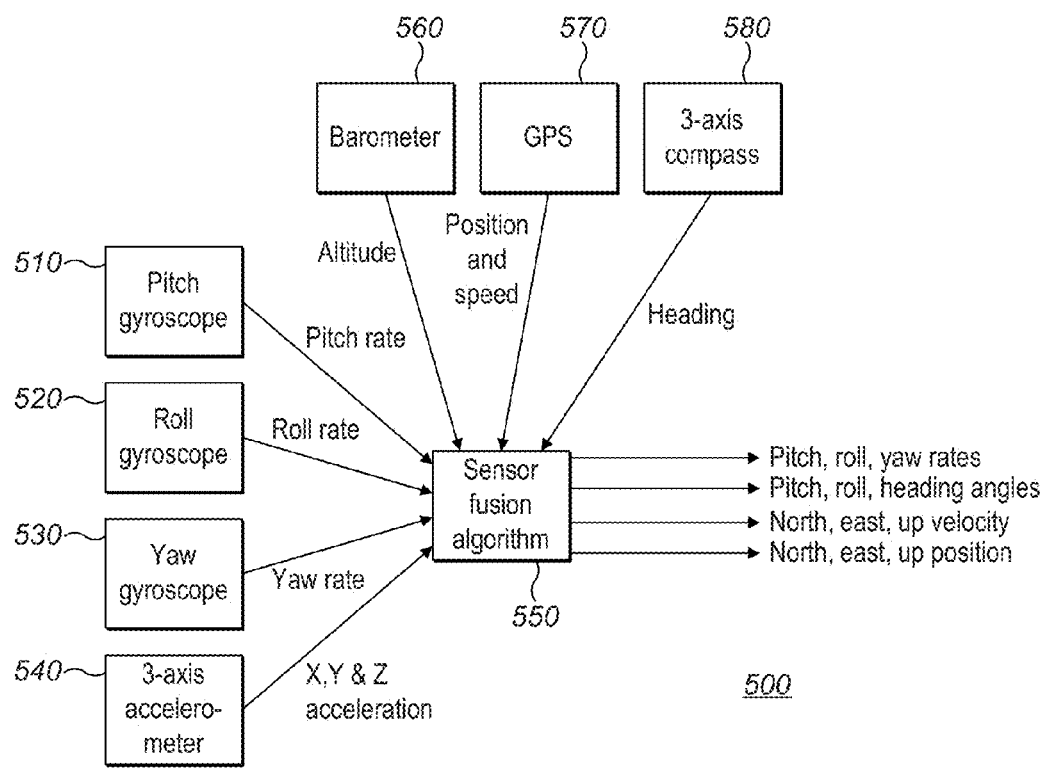
FIG. 5 is flowchart showing the elements of an enhanced IMU, according to some embodiments.

FIG. 5 shows an enhanced IMU 500, in accordance with some embodiments. Similar to the IMU 400, the IMU 500 includes gyroscopes 510, 520, and 530, whose outputs vary according to motion (slew) about their respective orthogonal axes, and 3-axis accelerometer 540. However, unlike the IMU 400, the IMU 500 also includes additional sensors to improve the IMU's performance during lateral or radial acceleration. These additional sensors may include a 3-axis compass 580 and a GPS system 570, which can be used to derive real heading, position and velocity of the gimbal. The real heading is obtained by comparing the gravitational vector with the known Earth magnetic vector. By resolving these vectors, a heading vector is obtained and then used to correct drift of the yaw-axis gyroscope 530. The heading vector provides the IMU 500 a fixed reference for comparing data obtained by the gyroscope. The IMU 400 does not have such a reference and relies on a long term averaging method to deduce a gyroscope offset bias. Further, the GPS derived velocities for East and North direction are resolved together with the heading vector to obtain an acceleration value that is used to correct erroneous measurements and/or gravitational acceleration for a radially moving gimbal base, thereby fixing the horizon drift issue.

More specifically, acceleration readings from the accelerometer 540 are integrated to derive velocity, which is then compared and corrected via the GPS derived velocity using another Kalman filter structure. These velocities may be further integrated and compared with yet another Kalman filter to the GPS position. The net result is a high bandwidth measurement of the position and velocity derived using integration of acceleration and correction with a slower set of readings from GPS. These high bandwidth readings are useful to allow higher order gimbal functions such as automatic correction of the camera's pointing angle. The accelerometer readings are corrected by the above-described process to remove the zero bias drift, similarly to the gyroscope, and enable deriving of an accurate gravity reference vector, uninfluenced by radial acceleration.

In some embodiments, the IMU 500 also includes a barometer sensor 560, which enables the IMU 500 to derive additional height change (altitude) information. In particular, the barometer-based height change information tends to be more accurate than the GPS-based height information. The barometers can resolve heights with accuracy of about 5 cm. The GPS sensors, however, typically resolve heights with accuracy of only 2.5 m CEP (circular error probable), because GPS signals are subject to environmental and reflection interference phenomena, in addition to constantly changing satellite constellations. Although the GPS sensors can provide a long term accurate data, they drift over short time frames, such as periods of seconds. In the IMU 500, the measurements derived by the barometer sensor 560 are then fused with the measurements derived by the accelerometer 540 using a Kalman filter in the manner similar to the GPS data, as described above. The derived GPS data may also be fused with the barometer data to provide for longer term corrections, for example, if there are local air pressure changes due to wind or weather.

Figure 6:
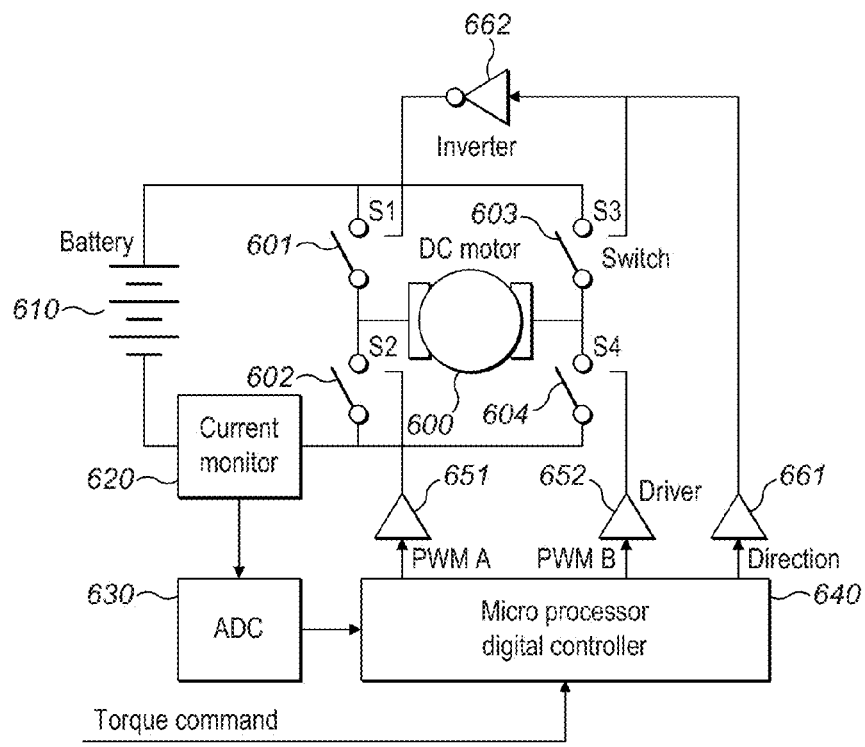
FIG. 6 is a schematic for a power control for a direct current (DC) motor, according to some embodiments.

As discussed above with respect to FIG. 2, in some embodiments, the actuators for rotating the payload are DC motors. FIG. 6 illustrates an example of a power control system for controlling a DC motor 600, according to some embodiments. A bridge containing four switches—switch S1 601, switch S2 602, switch S3 603, and switch S4 604—are arranged to provide reversible current to the motor 600 from a power source, such as a battery 610. In some embodiments, these switches are transistors, such as BJTs (bipolar junction transistors) or more commonly NMOSFETs (N-type metal-oxide-semiconductor field-effect transistors). In the arrangement of FIG. 6, if the switches S1 601 and S4 604 are closed, the motor 600 will run in a forward direction, while if switches S3 603 and S2 602 are closed, the motor 600 will run in a backward direction. If the motor 600 is in a state of motion, such as running forward, reversing the switches to trigger the backward rotation would effectively apply regenerative braking back into the power source via the dynamo effect, until physical reversal occurs.

In some embodiments, to achieve control characteristics with a minimal damped overshoot and fastest response time, the current is regulated through the motor. In particular, by modulating the duty cycle of any one switch in conjunction with the other switch for the required direction, a pulsed averaging may be achieved in combination with self-inductance of the motor, thereby reducing the applied voltage and current in a smooth way. For example, implementing a duty cycle of 50% would half the battery voltage that is needed to be applied to the motor 600. In some embodiments, the PWM frequency is set to a rate, which does not impart high switching losses and approximates a smooth current depending on the motor inductance. Further, by setting the frequency above the audible range, magneto-construction noises, otherwise polluting the soundtrack, may be reduced or removed.

Generating the gate drive for a NMOSFETs switch is typically easier on the low side power rail. Thus, in some embodiments, the bottom switches S2 602 and S4 604 are switched using pulse-width modulation ('PWM'). While the top switches S1 601 and S3 603 select a direction for the motor 600, in conjunction with the PWM switches S2 602 and S4 604, an inverter 662 ensures that only one direction is logically selected by the switches S1 601 and S3 603. A microprocessor 640 generates the PWM pulses, regulating them to achieve a desired drive current and direction. The current may be monitored via a current monitor 620, such as a shunt resistor paired with a hall device, and then fed into the microprocessor 640 using an analogue-to-digital convertor (ADC) 630.

In some embodiments, the motor 600 is designed to operate in a stalled condition and capable of sustained torque, without over heating or burning out. This may be achieved by winding the motor 600 with a sufficiently large number of turns such that the resistance is increased to a point where the full supply voltage can be applied across the motor 600 with an acceptable current. This would be the maximum torque condition, and it allows for a large number of turns which amplify the magnetic effect at a lower current.

It is preferable to match the motor 600 to the supply voltage such that a 0 to 100% duty cycle on the PWM equates to the full torque range. This will provide for inductive smoothing of the PWM signal due to the higher inductance that comes with a larger number of wire turns. At the same time, since the motion of a motor within a stabilization system is typically short (usually less than one second), a large back electromagnetic field (EMF) from the high turn motor winding is unlikely to cause a noticeably detrimental effect.

In some embodiments, the PWM switches are operated in a complementary manor. For example, if the switch S3 603 is energized for the motion in one direction, then the switches S1 601 and S2 602 are switched complementary to each other with PWM such that when the switch S1 601 is on, the switch S2 602 is off, while when the switch S1 601 is off, the switch S2 602 is on. Although this configuration requires additional PWM outputs from the microprocessor, it also provides for improved efficiency, for example, through active fly-wheeling, rather than using the body diode of the N-FET switch (which would otherwise cause a larger drop in voltage). In this configuration, when the complementary N-FET switch is turned on (during the active flywheel period), this would introduce a low resistance and, for typical currents, the voltage dropped would likely be less than 0.1V.

To provide for a quieter, or even silent, and smooth drive and/or to eliminate magneto-constriction noises polluting the filming soundtrack, the PWM is generally set to operate at higher frequencies. For example, in some embodiments, the PWM frequency is set outside the typical audible frequency range, e.g., higher than 20 kHz.

Figure 7:
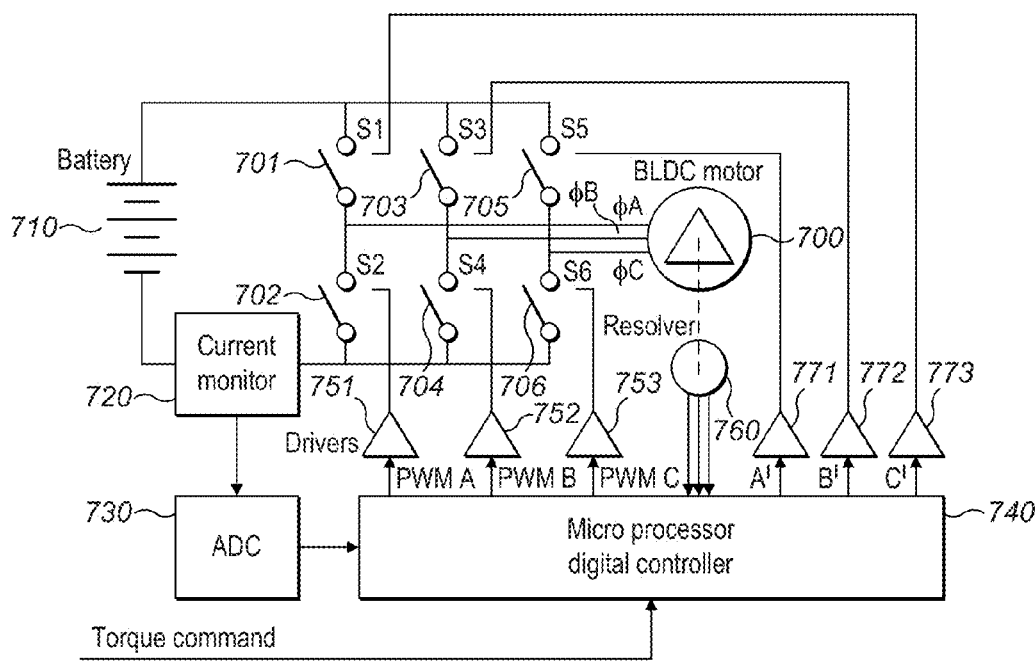
FIG. 7 is a schematic for an enhanced power control for a brushless DC motor, according to some embodiments.

In some embodiments, the actuator is a 3-phase BLDC motor (brushless DC) motor. Such a motor is generally more efficient, capable of achieving higher torque than a 2-phase motor, and is not limited by heating of commutator brushes as with a basic DC motor. FIG. 7 illustrates an example power control system for controlling a 3-phase BLDC motor 700.

A three-phase bridge is provided by six switches S1 701, S2 702, S3 703, S4 704, S5 705, and S6 706. The motor 700 is commutated by observing a resolver 760 that provides angular feedback of a position. The energization of the coils in the motor 700 is arranged to achieve forward or reverse motion using a 6-step commutation sequence with the switch pairs, in conjunction with the resolver 760. The resolver 760 may be an optical, resistive, or hall based device and may have 3 outputs to achieve a resolving code.

The remaining components of the power control system of FIG. 7 operate similarly to the components of the power control system of FIG. 6, described above. In particular, a battery 710 supplies power to the six switches 701 to 706. The current is monitored by a current monitor 720 and fed into a microprocessor 740 using an analogue-to-digital convertor (ADC) 730. Outputs A' 771, B' 772, and C' 773 of the microprocessor 740 are connected to the top switches S1 701, S3 703, and S5 705, while bottom switches S2 702, S4 704, and S6 706 are fed PWM signals from the microprocessor 740.

It should be noted that the motors 600 and 700 and the power control systems for controlling them of FIGS. 6 and 7 respectively are described for illustrative purposes only. Other types of motors and power control systems could be used, depending on the physical and/or commercial requirements. For example, the motor may be constructed as an out-runner to achieve greater torque for a given diameter by nature of magnet geometry, or the motor may be a pancake with exotica magnet arrays based on Halbach array methods to achieve even greater torque levels for a given size. A further example of a motor suitable for implementing embodiments described herein is a conventional induction machine.

Figure 8:
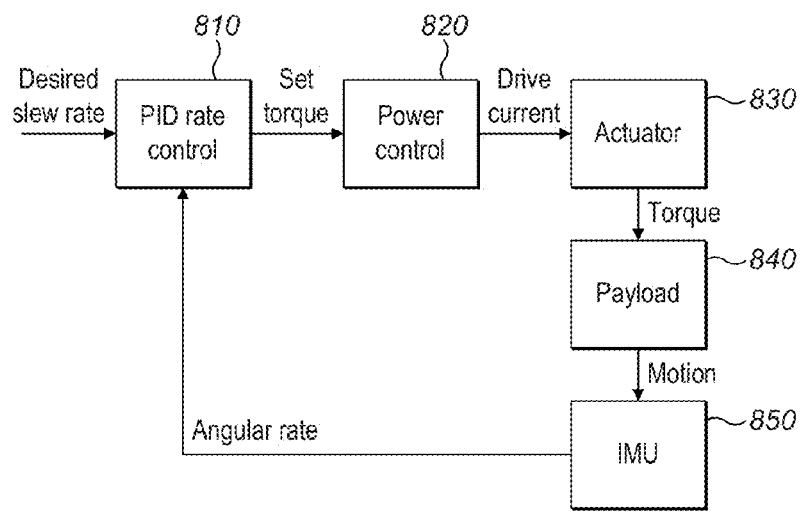
FIG. 8 is a flowchart illustrating an attitude control loop, according to some embodiments.

FIG. 8 illustrates a simple feedback loop for achieving closed loop control. An IMU 850 determines a motion, such as an angular rate, of a payload 840. At a PID (proportional-integral-derivative) rate control element 810, the measured angular rate of the payload 840 is compared with a desired slew (motion) rate provided as an input, to output a 'set-torque' command to a power control element 820. The power control element 820 provides a drive current to an actuator 830, which applies a torque to the payload 840 causing it to accelerate in the desired direction, which is again measured by the IMU 850. As a result, the loop is in closed feedback. Motion that does not equate to the desired slew rate will be amplified as an error and a compensating control signal will be provided to the power control element 820, and the actuator 830.

The control loop for FIG. 8 relies on detecting changes in motion, rather than changes in angle. Therefore, if there is a disturbance that causes the attitude to be jolted to a new position, the control loop of FIG. 8 may not be able to correct for the respective change in position.

Further, during a slow motion control, friction and stiction may interfere with the motion, causing a non-constant rate of movement. This may be undesirable, particularly during filming with a long focal length lens where control is needed to be subtle. Moreover, when using cheaper, smaller MEM sensors, the output of the sensors may be subject to random walk and noise in the determined rate, which may visibly impact their performance with unreliable drift.

Figure 9:
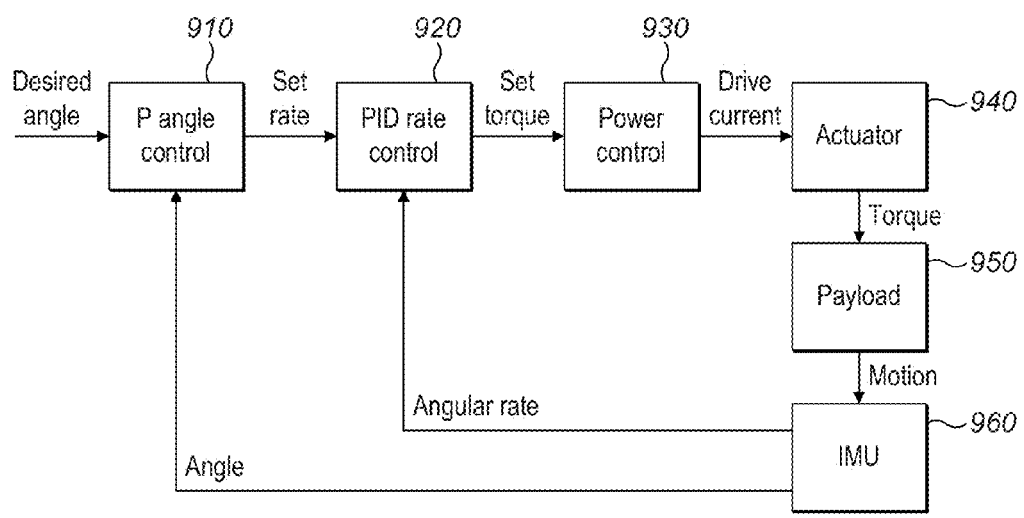
FIG. 9 is a flowchart illustrating an enhanced attitude control loop, according to some embodiments.

FIG. 9 shows an enhanced control loop that includes an angle control loop for addressing some of the problems indicated above. Similarly to the control loop of FIG. 8, in FIG. 9, a PID rate control element 920 receives, as input, a desired motion rate, as well as a detected angular rate of a payload 950 from an IMU 960. The PID rate control element 920 then sets a torque value as an input to a power control element 930, which subsequently sets the required drive current for an actuator 940 to achieve the torque value. However, unlike the attitude control loop of FIG. 8, in the control loop of FIG. 9, in addition to considering motion, desired (commanded) and detected (measured, derived) angles of the payload 950 are also considered. More specifically, a P (proportional) angle control element 910 receives, as input, a desired angle for the payload 950, as well as a detected angle of the payload 950 as determined by the IMU 960. The P angle control element 910 then sets a rate for the motion that would result in the desired angle. The proportional loop senses an error between the desired and measured angles and aims to keep this error to a minimum. In this manner, errors due to friction, stiction, and random walk are effectively cancelled out by means of the absolute attitude being the main control variable.

Figure 10:
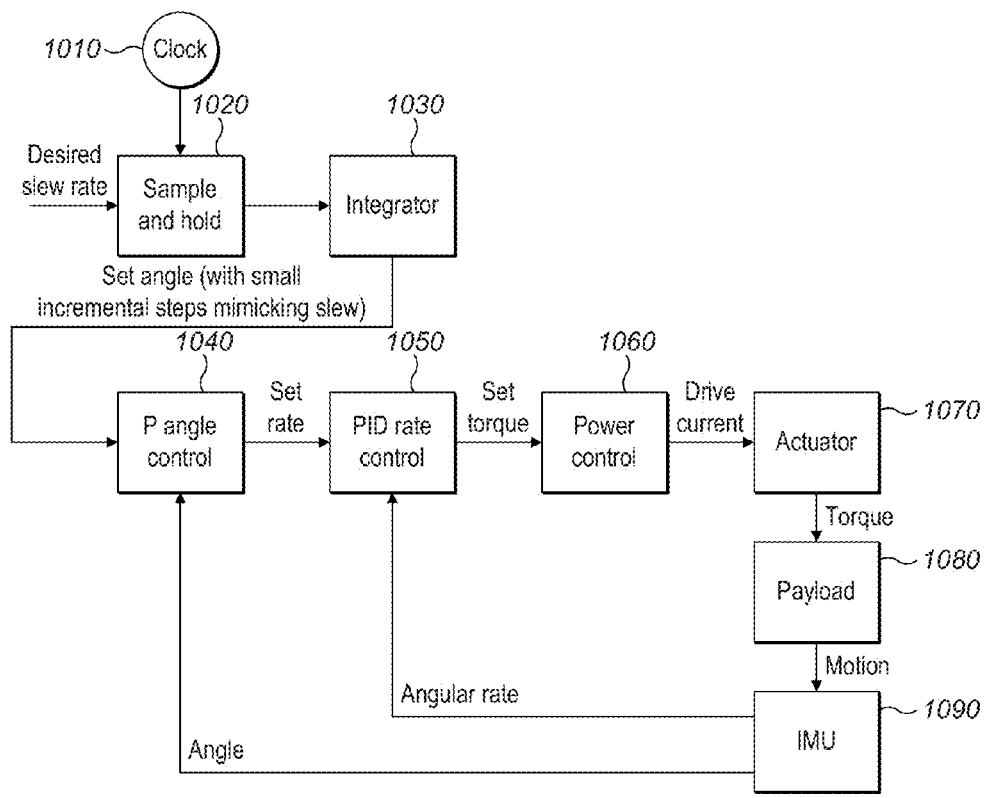
FIG. 10 is a flowchart illustrating an attitude control loop with an input mechanism, according to some embodiments.

Typical joysticks for controlling the direction of a camera determine a slew rate based on the joysticks' position. As the control loop of FIG. 9 takes an angle as input, rather than a desired slew rate, the slew rate output of a joystick should be converted to preferred angles. FIG. 10 illustrates how the control loop of FIG. 9 could be adapted to take a slew-based input. A desired slew rate from a control input, such as a joystick, is sampled at a sample and hold element 1020 at a frequent interval. This frequent interval is determined, for example, by a clock 1010. In some embodiments, the frequent interval is set between 400 Hz and 500 Hz. However, this range is exemplary only, and the frequent interval may be below 400 Hz or above 500 Hz.

The sampled slew rate is then integrated at an integrator 1030, using a constant period, which outputs a constant change in pointing angle. The change in this pointing angle mimics slew but is actually a number of sequentially different pointing commands that are closely related. These changing pointing angles are sent to a P angle control 1040, which also receives the detected angle of a payload 1080 as determined by an IMU 1090. The P angle control 1040 sets a rate for the motion that would result in the desired angle. It then sends the required rate of movement to a PID rate control 1050 unit, which also receives a detected angular rate of the payload 1080 from the IMU 1090. The PID rate control 1050 sets a torque value as an input to a power control 1060, which subsequently sets the required drive current for an actuator 1070 to achieve the torque value.

Figure 11:
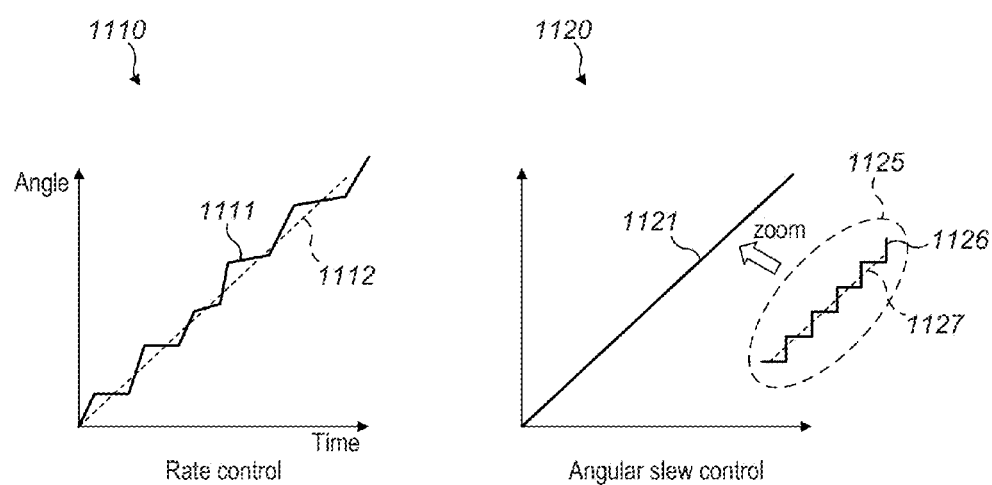
FIG. 11 shows a comparison of stabilization performance between two methods of controlling the stabilization system, according to some embodiments.

FIG. 11 illustrates the differences in performance of the rate control system illustrated in FIG. 8 and the angular slew control system illustrated in FIG. 10. Graph 1110 shows variations in angle over time for a rate control system where mechanical stiction and sensor random walk results in deviations of the resultant slew 1111 from the desired, smooth slew 1112. Graph 1120 shows the variations in angle over time for an angular slew control system. The actual motion 112, as shown, is much smoother than the corresponding motion 1111 of the graph 1110. This is because the attitude (or angle) loop automatically compensates for erratic errors and leaves only the minor ripple associated with the small steps, as shown in the magnified portion 1125 where the actual motion 1126 deviates from the desired motion 1127 by small steps. For example, to slew at 10°/s at 500 Hz requires steps of only 0.02° per step, resulting in the appearance of very smooth movement.

Figure 12:
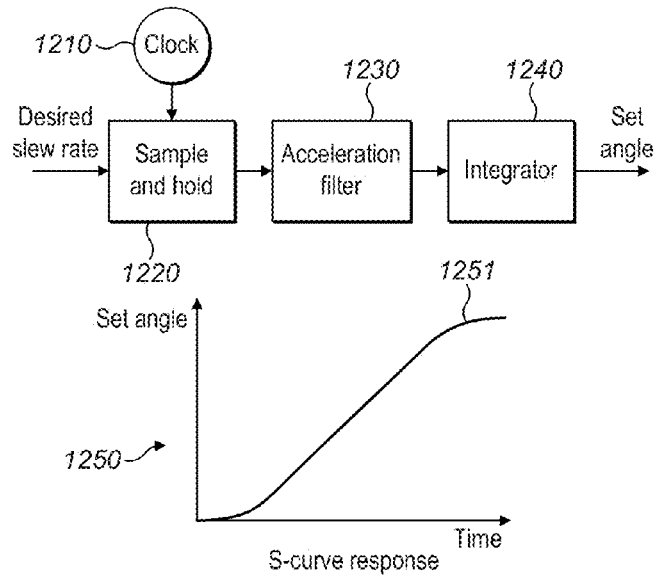
FIG. 12 illustrates an acceleration filter for modifying input commands, according to some embodiments.

In some embodiments, the input command, such as an operator command provided via a joystick, may be modified or filtered to result in a desired control effect. For example, the operator may wish to reduce the jerkiness of the input signal, and to have a gradual start of motion, followed by a period of constant motion, and then a gradual stop of motion. Such an effect may be difficult to achieve manually. FIG. 12 shows how to improve or alter the input received at the control loop by introducing a filter into the loop.

In particular, as in FIG. 10, in FIG. 12, a sample and hold element 1220 samples a desired slew rate at a frequency determined by a clock 1210. However, unlike FIG. 10, where the sampled rate is inputted directly into an integrator, in FIG. 12, the sampled rate is inputted into an acceleration filter 1230 for filtering, and only the filtered signal is then integrated at an integrator 1240, which sets the angle for the rest of the control loop. Graph 1250 shows a possible response curve 1251, illustrating how an input slew rate can be filtered to produce a more desirable, smoother result.

In some embodiments, the filter 1230 is based on a symmetrical non-causal least squares filter (similar to a Wiener filter), which has length, and thus memory or periodic samples. Each new sampled rate is introduced into the filter, which acts as a shift buffer. The filter 1230 uses a straight line fit and takes values at the mid-point of that line fit. When the buffer is full of similar samples, the fit will be the desired (commanded) input value. For example, if the buffer is full of 20 zeros, and a new sample of 10°/s value is introduced, then the slope of the least square fit will be shallow and give a mid-point underestimate of the required value. If the buffer, however, is full of 20 samples, each having a value of 10°/s, then the slope will be flat and give a projected mid-point of 10°/s as commanded. If the buffer is intermediately full of similar samples, the slope of the fit may be positive or negative and changes in a way of acceleration or deceleration—the commanded output versus the commanded input. The filter 230 may use a mixture of historical samples, which were not commanding a motion, and the more recent samples, which were commanding a motion. Once the filter 1230 is flushed with constant input values, the output is also constant and unchanging. If motion is commanded to stop, then the filter gradually flushes through to give zero at the output. The smoothing of the filter has a desired characteristic, which may be tailored by altering the length of the filter. Other, more numerically efficient filters such as Savitzky-Golay, or FIR based, may also be employed as the filter 1230.

Figure 13:
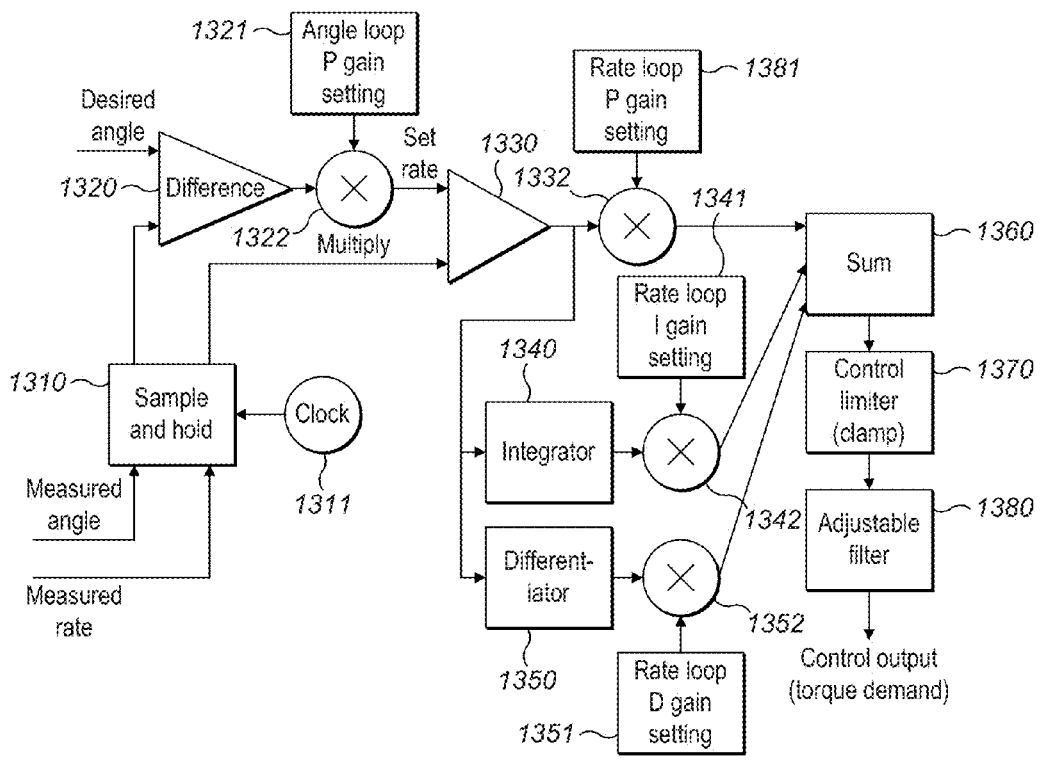
FIG. 13 is a detailed flowchart of the elements in a control loop for stabilizing a stabilization system, according to some embodiments.

FIG. 13 illustrates a more detailed diagram of a digital PID control loop, according to some embodiments. Measured IMU angular rate and angle are sampled and held at 1310 at a control loop tick rate determined by a clock 1311. In some embodiments, the control loop tick rate is in sympathy with the drive updates to the actuator. The difference between the measured angle and the desired set angle is calculated at 1320, and the resulting error is multiplied at 1322 by an angle loop P (proportional) gain 1321 to generate a command set rate for an inner loop.

The command set rate from the multiplier 1322 is subtracted at 1330 from the measured IMU angular rate 1310 and the resulting error is multiplied at 1332 by an inner P rate loop gain 1331. The same error is also integrated at 1340 and differentiated at 1350 at each clock update, where the output of the integrator 1340 is multiplied at 1342 by an integral (I) gain setting (constant) 1341, while the output of the differentiator 1350 is multiplied at 1352 by a differential (D) gain constant 1351. The results of these three multiplications 1332, 1342, and 1352 are summed at an aggregator 1360, forming a PID loop for the inner rate control.

In some embodiments, the output of the aggregator 1360 is clipped at the control limiter 1370 to reduce potential problems with saturation (such as demanding too much torque). The output may also be fed through an optional filter 1380, which is a digital low pass or notch filter based on FIR (finite impulse response) and IIR (infinite impulse response) techniques. The filter 1380 is generally configured to alleviate issues associated with structural resonance, which might otherwise disturb the control loop response. For example, the filter 1380 may be configured such as to cut off prior to a control instability point or notch out a hi-Q peak at some frequency which could cause mechanical resonance. In some embodiments, a rate limiter (not shown) is included into the outer control loop to limit the slew rates—the command set rate from the multiplier 1322. The output of the aggregator 1360 eventually reaches a control output to power an actuator and cause movement.

In some embodiments, the gain settings 1321, 1331, 1342, and 1352 of the PID loop are adjustable. In this manner, a desired control response with minimal overshoot and rapid response, without instability, may be achieved and/or adjusted. The P gain sets the overall loop gain to reduce disturbance errors. The I gain sets the accuracy for small errors on longer time scales, thereby effectively setting a time constant. With the I gain, finite errors may be cancelled out, with absoluteness. The D gain sets some predicted output, particularly helping with fast motion, and is generally used to improve the speed response. In some embodiments, the control loop is based only on the two P loops. However, in some other embodiments, the I and D gains are introduced for better performance.

Figure 14:
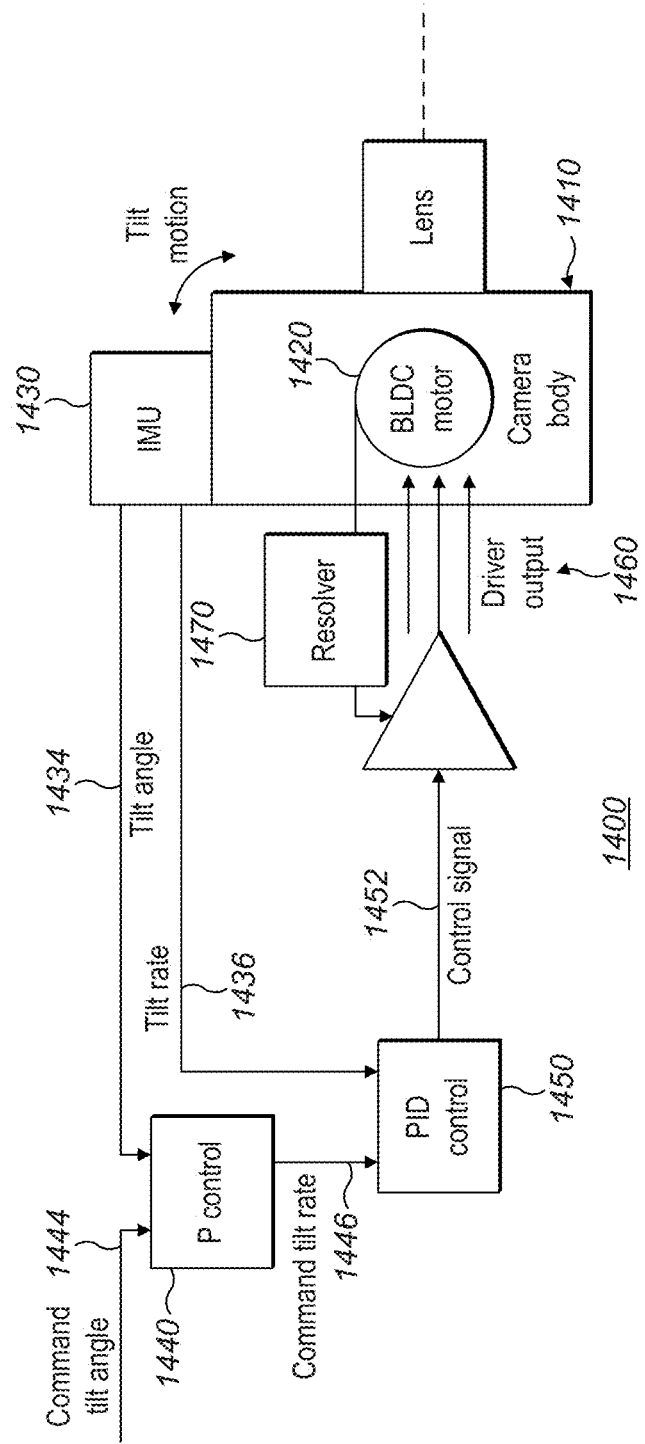
FIG. 14 is a flowchart of a single axis stabilization controller for controlling a pointing angle of a camera, according to some embodiments.

FIG. 14 illustrates a single axis stabilization control process 1400 for controlling a tilt angle of a payload, e.g., a camera 1410, housed by an active stabilization system (gimbal). The process 1400 controls the tilt angle of the camera 1410 using a brushless DC motor 1420, determining required adjustments based on measurements obtained by an IMU 1430. The IMU 1430 is mounted on the body of the camera 1410 or otherwise co-located with the camera 1410 (e.g., on a camera head) so as to be able to sense (measure, determine, provide, derive, or the like) position and velocity of the camera 1410. As discussed in more detail with respect to FIG. 9, such an IMU comprises a GPS, a 3-axis accelerometer, a 3-axis gyroscope, a 3-axis compass, and a barometer and incorporates a sensor fusion algorithm that enables the IMU 1430 to accurately derive a 3-dimensional (3D) position and a translational velocity associated with the camera. In some embodiments, the measurements acquired by the IMU are cm and cm/s accurate.

The IMU 1430 updates its measurements at a fixed update rate. Not all measurements, however, are necessarily updated at the same rate. For example, measurements derived from data sensed by the accelerometer may have a different update rate than measurements derived from data sensed by the gyroscope (e.g., 160 Hz and 500 Hz respectively). Thus, when the update rates differ for different IMU sensors, a single measurement corresponding to a lower update rate may be used in combination with different measurements corresponding to a higher update rate.

Update rates employed by the IMU overall and its components are generally depended on the technical characteristics and/or requirements of the IMU components, desired accuracy, computation characteristics, computation requirements, and/or the like. For example, typical MEM's based gyroscopes are able to provide readings upwards of 1 kHz. Further, using a lower update rate to obtain the accelerometer measurements (e.g., 160 Hz) than to obtain the gyroscope measurements (e.g., 400-500 Hz) allows the IMU to derive reliable measurements from both sensors, and also to conserve computing power and memory by not performing computations that would not otherwise improve the IMU reliability or accuracy. Also, small gimbal structures may require faster control than larger, heavy units that inherently have a greater inertial damping. Accuracy achieved by sampling a greater number of readings to enable better averaging may need to be balanced against a control bandwidth greater than frequencies which may be constituent in disturbance noise. In some circumstances, however, control achieved at lower rates, such as 50 Hz, may be sufficient, for example in an active stabilization system mounted on a vehicle.

The stabilization control process 1400 employs a closed loop electro-mechanical feedback based on the proportional-integral-differential control technique. Both the tilt angle (attitude) and the tilt rate (motion, slew) of the camera 1410 are considered to determine the tilt angle update. The stabilization control process includes two nested loops, an outer loop for correcting angle errors and an inner loop for correcting control errors and stabilizing the tilt motion.

The outer, angle-based loop includes a P control element 1440, which receives, as input, a tilt angle 1434 of the camera 1430, as detected by the IMU 1430, and a command tilt angle 1444 for the camera 1410. The command angle 1444 generally reflects intentions of the camera operator, actual or remote, at the time. More specifically, the command tilt angle 1444 may be set by a remote operator via a remote link, by the camera operator via a control device, such as a thumb joystick, or derived from the camera operator's intentions expressed by the operator lifting and steering gimbal handles, such as the handles 113 shown in FIG. 1, and determined based on the gimbal joint angles. The P control element 1440 compares the command and measured tilt angles and sets a command tilt rate 1446 for the motion that would result in the command tilt angle. In particular, P control element 1440 senses an error between the command and measured tilt angles 1444 and 1434, amplifies the error by a proportional gain constant, and feeds the amplified error into the inner loop, thereby minimizing the angle error.

The inner, rate-based closed feedback loop includes a PID control element 1450, which receives, as input, a tilt rate 1436 of the camera 1410, as detected by the IMU 1430, and the command tilt rate 1446, as set by the P control element 1440. The PID control element 1450 compares the two tilt rates to detect a control error, which it amplifies using proportional, integral, and differential constants to set a control signal 1452 (such as a torque value) for controlling movement of a brushless DC motor 1420 (or another actuator, such as a motor, a gearbox, a belt reduction drive, or the like). In particular, the output of the PID control element 1450 is fed to the brushless DC motor 1420 via a driver output element 1460 to form an overall closed loop feedback circuit, thereby causing acceleration, deceleration (brake), or a reverse movement of the brushless DC motor 1420. The driver output element 1460 outputs 3-phase currents to the motor 1420 and forms a local control loop together with an angle resolver 1470 for controlling the 3-phase currents accurately and dependent on the motor phase angle. In some embodiments, the outputs of the driver output element 1460 effectively control a torque generated by the motor 1420 to accelerate/decelerate gimbal's tilt rotation.

Generally, the stabilization control process has a fixed update rate (e.g., 400 Hz) so as to enable discrete control decisions by the stabilization controller 1400. However, the update rate may be slower, or faster, depending on a specific design of the actively stabilized gimbal. Further, in some embodiments, the stabilization control process 1400 is digital and implemented using software.

Depending on a particular application, the stabilization control process 1400 is replicated for some or all of the tilt, roll, and pan axes with the servo motors employed for the tilt, roll, and pan axes respectively. In response to the commands issued by the stabilization control processes for the respective axes, these motors operate to correct disturbances to the camera's pointing direction, automatically, such as to maintain a constant pointing angle (attitude) for each of the axes.

Accordingly, the actively stabilized camera gimbal corrects disturbances to the camera pointing direction automatically by maintaining a constant pointing angle for the camera based on the gyroscopic feedback and on the command attitude fed into the active stabilization controller. However, a remote operator is typically required for changing of the pan, tilt, and roll angles/rates of the camera, such as via a remote link, using a joystick or other controller. In such a scenario, two operators must translate and point the gimbal (camera) simultaneously. That is, successful filming requires careful collaboration between the camera operator and the remote operator when controlling the translation route and pointing plan of the camera respectively. A further complexity of this dual-operator control arrangement is that multiple radio transmitters, extra equipment, and resources that are employed to support it. Alternatively, the camera operator himself or herself may be able to set a desired angle using a thumb joystick or other controller on the hand-held active stabilization system. However, similarly to the dual-operator approach, the single-operator control approach may compromise gimbal maneuvering and is difficult to use to achieve a desired result consistently.

To address this problem, in some embodiments, the active stabilisation controller is adapted to enable the camera operator to steer the camera's pointing direction by applying an external disturbing force to the gimbal or the camera (such as the camera body or lens). In particular, to steer the camera, the camera operator applies force generally in a direction of a desired rotation/change. For example, a force down causes the camera to tilt down, while a force left causes the camera to pan left, and the like. When the force is removed and/or the pointing angle adjustment is stopped, the last registered pointing angle of the camera becomes the commanded pointing angle and is maintained by the active stabilization controller. In some embodiments, the camera operator is able to steer the camera's pointing direction only when certain condition(s) are met, such as when the applied force exceeds a pre-set threshold or when an unlock-angle condition is triggered, e.g., by engaging a special purpose button, trigger, controller, actuator, or the like.

Figure 15:
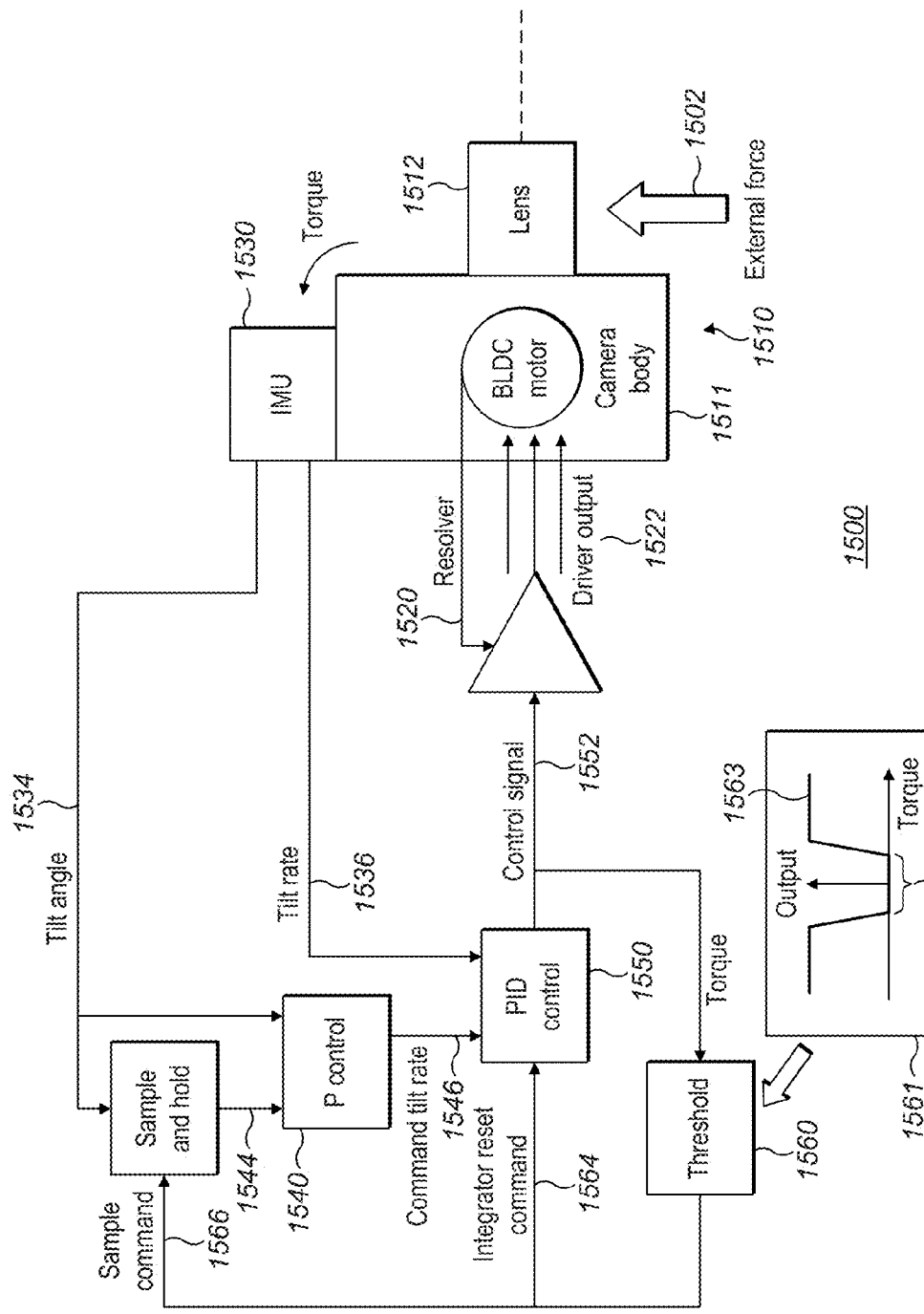
FIG. 15 depicts a flowchart of a single axis stabilization controller that enables manual adjustment of a camera's pointing angle, according to some embodiments.

To enable the steering of the camera's pointing direction responsive to the externally applied force, the active stabilization controller registers the external force and responds to the registered force by adjusting the camera's pointing angle at an appropriate rate. FIG. 15 shows suitable modifications, according to some embodiments, to a single axis (tilt-axis) active stabilization controller (control process), such as the controller discussed with respect to FIG. 14, for enabling steering (manual adjustment) of the actively stabilized camera by sensing an externally applied force. Similar modifications can be made to a pan-axis active stabilization controller for controlling the pan angle of the camera and to a roll-axis active stabilization controller for controlling the roll angle of the camera.

More specifically, similarly to the stabilization control process 1400, a stabilization control process (controller) 1500 implements an angle-based P loop and a rate-based PID loop with P and PID control elements 1540 and 1550 respectively. The P control element receives and compares a tilt angle 1534 of a camera 1510 detected by an IMU 1530 and a command tilt angle 1536 to issue a command tilt rate 1546, which is provided to the PID loop. The PID control element 1550 also receives a tilt rate 1536 of the camera 1510, as detected by the IMU 1530 and compares the two tilt rates to detect a control error, which it amplifies using proportional, integral, and differential constants to set a control signal 1552 for controlling movement of a brushless DC motor 1520. The output of the PID control element 1550 is then fed to the brushless DC motor 1520 via a driver output element 1522 to form an overall closed loop feedback circuit, thereby causing acceleration, deceleration (brake), or a reverse movement of the brushless DC motor 1520.

Thus, similarly to the active stabilization control process 1400, the active stabilization control process 1500 is able to perform the active stabilization process for stabilizing a pointing direction of the camera. However, unlike the stabilization control process 1400 that maintains the camera's pointing angle based on the command tilt angle 1444, received as a "set-point," for example, from a remote operator via a remote link, in the stabilization control process 1500, the stabilization control process 1500 enables manual steering of the camera's pointing direction, for example, when a sufficient external force is applied to the gimbal or the camera.

More specifically, in the example of FIG. 15, the stabilization control process 1500 registers the external force applied to the camera or the gimbal and, if the external force exceeds a pre-set threshold, adjusts the pointing angle of the camera in a direction that the external force is applied, until the external force is reduced below the threshold. The applied force causes a small displacement in relation to a tilt (pan or roll) axis due to the natural response of the control loop. The stabilization controller 1500 registers a new pointing angle of the camera based on such a displacement. As soon as the new pointing (holding) angle is registered, the control loop backs off and settles into the new position. Consequently, the torque is reduced and, unless the force is re-applied, the pointing angle adjustment/motion stops. In the stopped state, the controller 1500 returns to the normal closed loop angle/attitude stabilisation. That is, the stabilization control process interprets disturbances (force) below the threshold as a normal stabilization scenario. Consequently, it runs the P/PID control update in a closed control loop to stabilize/maintain the pointing angle of the camera, similar to the stabilization process 1400 of FIG. 14, although based on a commanded pointing angle held by a sample and hold element 1570.

A reaction torque is a direct result of the applied external force, and thus, may be measured to register the external force. In the stabilization control process 1500, the reaction torque is set by the actual control signal 1552 applied to the driver motor to stabilize the pointing angle. Therefore, the stabilization control process 1500 compares the torque set by the control signal 1552 to a threshold 1562, at a threshold element 1560. If the torque 1562 exceeds the threshold, a sample command 1566 and an integrator reset command 1564 are issued. For example, as shown in a graph 1561 in association with the threshold element 1560, in some embodiments, the threshold element 1560 outputs a binary value 1563 where a logical value of one indicates that the torque 1552 exceeds the threshold 1562, thus causing a sample command 1566 and an integrator reset command 1564 to issue. In the shown example, the binary value 1563 is a logical value of zero when the torque 1552 is below threshold. Other suitable arrangements for determining whether the force (torque) 1552 exceeds the threshold may be used as well.

By setting and/or adjusting the threshold, the camera operator can tune the amount of torque, required before the steering (movement, adjustment, and the like) of the pointing angle is enabled, to a particular filming scenario or certain filming preferences. For example, the active stabilization controller typically needs to react only against low forces because the gimbal is naturally balanced. Thus, in some embodiments, the threshold is set above the normal stabilisation torques. However, when a camera operator intends to film a scene that may result in external forces being registered unintentionally, for example, while running or transporting the gimbal over an uneven terrain, a higher threshold may be selected to prevent jolt and jumps from being registered as an external force.

Whenever the output control signal 1552 exceeds the torque threshold 1562, the threshold element 1560 commands a sample and hold element 1570 to sample and store the current tilt angle 1534, determined by the IMU 1530, as the command tilt angle 1544. Until the external force falls below the threshold, such setting effectively disables the P-control loop. That is, since the command tilt angle 1544 and the current tilt angle 1534 are the same, the output command tilt rate 1546 of the P-control element 1540 equals zero. The threshold element 1560 also issues the integrator reset command 1564 to reset an integral accumulator in the PID element, thus effectively setting the current control position at a zero error. In this manner, a smooth movement for changing the pointing angle of the camera is provided, with little discontinuity or pointing hysteresis.

Accordingly, to continuously slew the gimbal, the operator needs to maintain an external force on the gimbal or the camera in a desired direction. Effectively, the angle adjustment (motion) self-stops when the force falls below the threshold. When the external force is removed or reduced below the threshold, the stabilization control process 1500 resumes active stabilization and maintains the last pointing angle 1534 of the camera, as determined by the IMU 1530.

Although not shown, the active stabilization control process 1500 may also receive the command tilt angle 1544 as a set-point, such as from a remote-operator. The active stabilization control process 1500 would use such a set-point command tilt angle to stabilize the pointing angle of the camera by running the normal closed loop stabilisation.

In some embodiments, instead of determining the external force based on the control signal 1552, one or more external force pressure sensors are positioned on the gimbal or the camera. The pressure sensor(s) measure pressure applied by the camera operator and provide its(their) measurement(s) to the threshold element (controller) 1650 that processes the measurement(s) in a manner similar to the control signal 1552 to determine whether to allow the manual angle adjustment. In such embodiments, the active stabilization system includes at least one pressure sensor for each of the tilt, pan, and roll axes for which a manual pointing angle adjustment is desired. Such sensors may be located on the gimbal and/or on the camera, such as on a camera body 1511 or a lens 1512.

In some embodiments, the stabilization control process 1500 is further enhanced (not shown) to be able to interpret the external force as force acting on inertia. More specifically, the stabilization control process 1500 decreasingly resists an adjustment of the pointing angle when the camera operator starts the manual adjustment of the pointing angle and as the operator continues to apply the external force, and increasingly resists an adjustment of the pointing angle when the camera operator completes the adjustment, as the operator removes the external force. In other words, the stabilization controller provides for a heavy flywheel like effect, where the camera's pointing angle rate first steadily increases in a direction of the applied external force until it catches up with the manual update rate, and then slowly decays on the release of the torque (when the external force is no longer applied). In particular, on the release of the torque, the pointing direction of the camera continues changing, slowly decaying in rate and coming to rest.

To achieve the flywheel like effect, the stabilization control process 1500 implements one of a differential equations known in the art, including but not limited to one or more decay equations (e.g., equations describing the physics of viscosity where the force is a function of a velocity squared). Dampening changes in the rate of change of the pointing angle of the camera provide for a smoother pointed movement, which is desirable for filming.

More specifically, in some embodiments, the process 1500 is enhanced by incorporating an integrating function to introduce a pseudo angular velocity for changing the command tilt angle 1544. The angular velocity is accelerated by the torque in conjunction with an inertia coefficient and decelerated by a viscosity coefficient, acted on by the square of the velocity. The command tilt 1544 is updated at each control interval (update, cycle) using the pseudo angular velocity and the synthesised acceleration based on the torque and deceleration based on the viscous friction. The update is typically of the same rate as the control loop rate and provides the illusion of smooth and continuous motion.

Furthermore, in some embodiments, by combining an electro-mechanical system with equations of motion, a large inertia camera and gimbal are emulated using a lightweight system. That is, the active stabilization system could be tuned for a particular response, as desired, by adjusting coefficients representing inertia and viscous or other friction models. For example, a lightweight gimbal, such as the gimbal of FIG. 1, but without handles 113, may be mounted on a tripod and tuned to provide a control feel similar to that of a legacy heavy weight camera. This makes it easier for camera operators to switch from the legacy cameras to the described system.

For active stabilization systems that are subject to dynamic forces, the active stabilization controller, such as the controller 1500 of FIG. 15, may become confused if the torque threshold is set too low. For example, a vehicle-mounted gimbal may register an unwanted torque and allow the pointing direction to change in response to the vehicle going over a bump. The danger of registering an unwanted torque increases if the gimbal has not been properly balanced, for example, in tilt if the camera has a long and heavy zoom lens. One approach to address this problem is to set a higher threshold. In an extreme scenario, the torque threshold can be set to about the maximum torque value that the gimbal motor could provide.

However, by increasing the torque threshold, a likelihood of the ratchet-like movement of the pointing angle is increased as well. In particular, the motion would start above a level set by the torque threshold and then would stop because the torque is reduced by deflection until the continued pressure by the operator restores the force. Inconsistent force application (such as by a hand) may also increase the likelihood of the ratchet-like movements.

Figure 16:
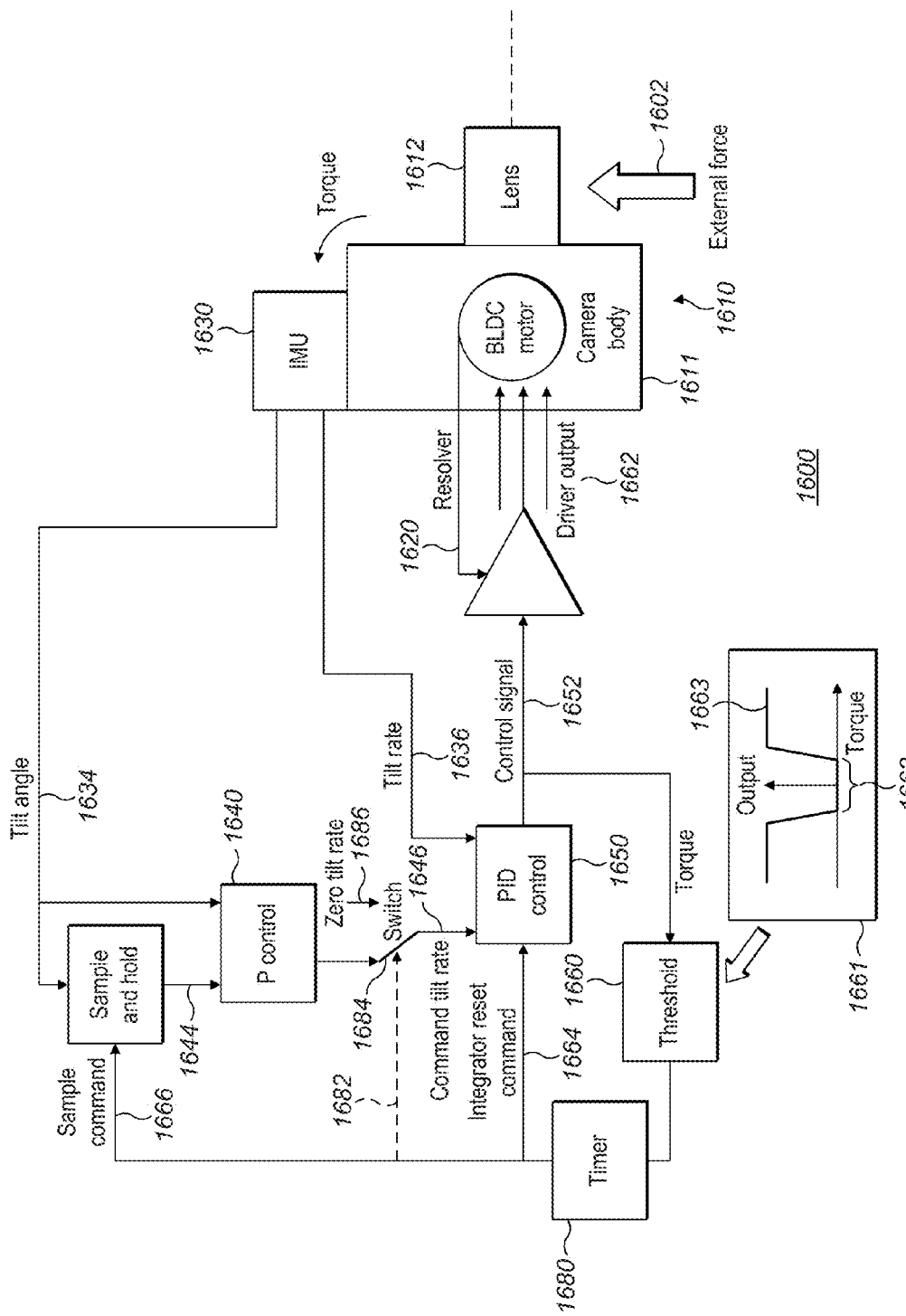
FIG. 16 depicts a flowchart of a single axis stabilization controller that enables manual adjustment of a camera's pointing angle using a timer, according to some embodiments.

To address this problem, in some embodiments, the active stabilization controller incorporates a timer that forces the pointing angle to lock when it expires. FIG. 16 shows an active stabilization controller (control process) 1600 that incorporates such a timer.

More specifically, the active stabilization controller, similar to the controller 1500 of FIG. 15, includes a threshold element 1660 for determining whether the external force exceeds a pre-set threshold 1662 and a sample and hold element 1670 for sampling and holding a current pointing angle of the camera as a commanded pointing angle, upon receiving a respective command 1666 from the threshold element 1660. However, unlike the controller 1500 of FIG. 15, the active stabilization controller 1600 also includes a timer 1680, which is started (restarted) upon the threshold element 1660 determining that the force 1602, represented by the control signal 1652, exceeds the threshold 1662. The timer 1680 operates a switch 1684 by issuing a respective command 1682 to effectively enable and disable the outer angle-based P loop. That is, when the timer 1680 is restarted, the control update loop becomes a rate-based PID loop only and its input is a zero command tilt rate. As discussed with respect to FIG. 15, such a rate loop allows manual adjustment (free movement) of the camera's pointing angle, while also provides some resistance to such an adjustment. That is, the rate loop creates a feeling of viscous movement.

In some embodiments, similar to the controller 1500 of FIG. 15, the threshold element 1660 also causes an integral accumulator of the rate loop to be reset, thus effectively setting the current control position at a zero error. In this manner, a smooth movement for changing the pointing angle of the camera is achieved, with little discontinuity or pointing hysteresis. In FIG. 16, the timer 1680, instead of the threshold element 1660, may reset or cause a reset of the integral accumulator. Depending on a particular implementation, the integral accumulator may be reset when the timer 1680 is restarted and/or when the timer 1680 expires, or at each update cycle as the timer 1680 is running.

The timer 1680 sets a delay time period of nominal time sufficient to allow the camera operator to manually adjust the pointing direction of the camera. However, this pre-set delay is adjustable by the camera operator and may vary between different implementations. Once the timer 1680 expires, the active stabilization controller 1600 switches back to the thresh-holding mode in which the external force 1602, as for example represented by the control signal 1652, is compared to the pre-set threshold 1662 to determine whether the manual adjustment of the camera should be allowed.

In some embodiments, the timer 1680 is further configured to prevent premature locking off the pointing angle of the camera. For example, once the timer 1680 expires, a determination is made whether the camera/gimbal continues to experience the external force 1602 applied by the camera operator. If such a force is detected, the timer 1680 is restarted, even if the force is below the threshold. In this manner, the camera operator is enabled to adjust the camera's pointing angle slowly (and/or by small adjustments), without hindrance. However, once the pointing angle stops changing, the active stabilization controller locks (finalizes, saves, and the like) the pointing angle, after the pre-set delay period. In some embodiments, the timer 1680 has different delay time periods for post initial determination that the external force 1602 exceeds the threshold 1662 and for subsequent re-starts due to the manual adjustment process being in progress. For the example, the initial delay time period may be longer than the subsequent re-start time periods. Further, the delay time period may decrease with each re-start during the same manual adjustment movement.

Similar to the controller 1500 of FIG. 15, once the manual adjustment process of setting a new pointing angle is completed, the current pointing angle 1634 of the camera, as measured by the IMU 1630, is set as the commanded pointing angle 1644. This commanded pointing angle is maintained for the camera by the normal stabilization update cycle, until another external force exceeding the pre-set threshold is determined, or a new commanded angle is set by the remote operator.

Figure 17:
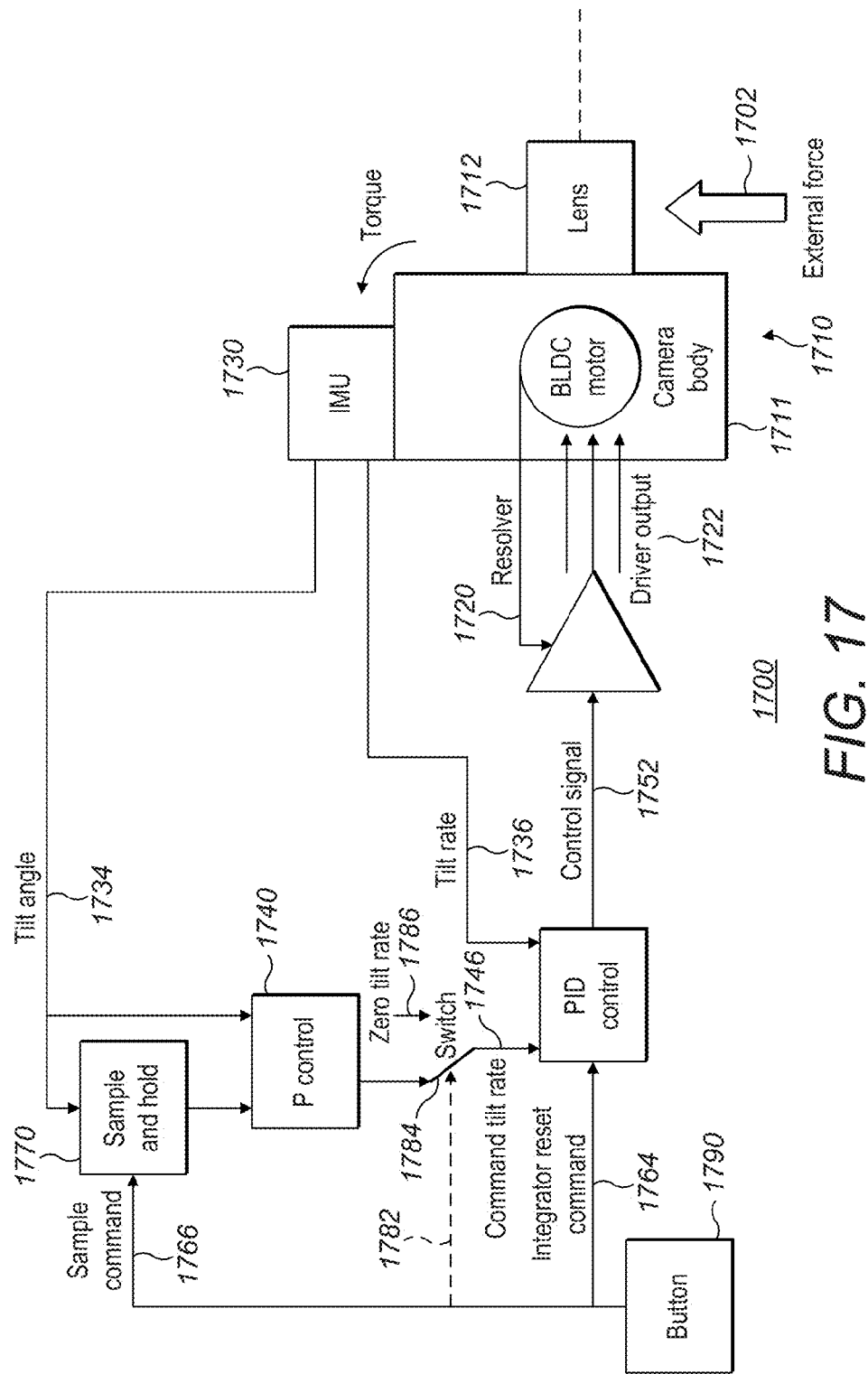
FIG. 17 depicts a flowchart of a single axis stabilization controller that enables manual adjustment of a camera's pointing angle when a trigger is engaged, according to some embodiments.

FIG. 17 depicts an active stabilization controller 1700 according to some embodiments. Unlike the active stabilization controllers 1500 and 1600 of FIGS. 15 and 16, the active stabilization controller 1700 does not compare the external force to a certain torque threshold or even require determination of the external force. Rather, in FIG. 17, the pointing angle of the camera is unlocked for manual adjustment in response to a trigger 1790, such as a special purpose button, actuator, or other controller, located on the gimbal or the camera. Effectively, the trigger's activation (engagement) causes the active stabilization controller 1700 to behave similarly to the active stabilization controller 1600 after the timer 1680 has been reset. However, unlike the active stabilization controller 1600, the active stabilization controller 1700 does not include a timer, and thus does not set a pre-defined time period for the camera operator to adjust the pointing angle of the camera. Rather, in FIG. 17, the time period for adjusting the pointing angle of the camera varies from one adjustment to another, and lasts as long as the trigger 1790 remains engaged.

In some embodiments, the camera operator is required to hold, pull, or otherwise physically engage the trigger 1790, such as a button, down for the duration of the manual adjustment process. Once the camera operator releases the trigger 1790, the active stabilization controller returns to the normal stabilization cycle based on the last measured pointing angle of the camera. In some other embodiments, the camera operator is not required to hold or otherwise physically engage the trigger 1790. Rather, the camera operator pushes, pulls, or the like the trigger 1790 (e.g., pushes a button) to engage the trigger 1790 and switch to the manual adjustment mode, and then pushes, pulls, or the like the trigger again to lock the current pointing angle of the camera and return to the normal stabilization mode. Other arrangements suitable arrangements may be employed as well, for example, using a remote controller, announcing a voice command, shaking the gimbal vigorously, tapping the gimbal, e.g., with a finger, so that the control loop registers the tapping a command (e.g., two successive taps to activate a timer or manual adjustment mode, and to allow manual adjustment of the pointing angle), and the like. Further, tapping command may be executed in the IMU area and registered as a shock, or somewhere on the gimbal so as to register as an unwanted displacement.

Figure 18:
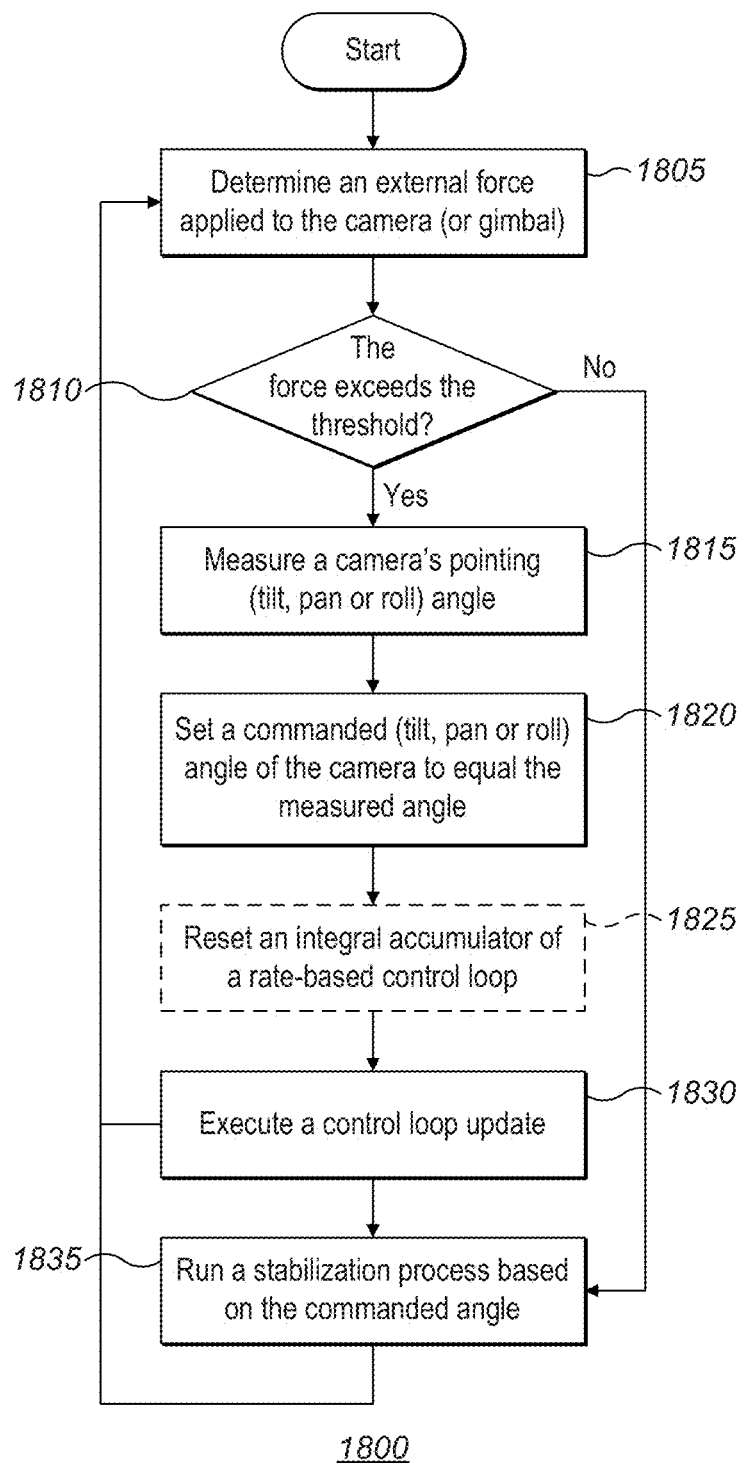
FIG. 18 illustrates a flowchart of a method for adjusting a pointing angle of an actively stabilized camera responsive to an externally applied force, according to some embodiments.

FIG. 18 depicts a method 1800 executed by an active stabilization controller, such as the active stabilization controller of FIG. 15, in accordance with some embodiments. The method 1800 starts with step 1805 of determining an external force applied to the camera (or the gimbal). As described, for example, with respect to FIG. 15, such an external force may be computed based on the control signal setting a torque to control movement of the gimbal's brushless DC motor for a respective axis or by a corresponding pressure sensor.

The method 1800 then proceeds to step 1810 to determine whether the determined force exceeds a pre-set threshold (torque threshold). As described with respect to, for example, FIG. 15, the threshold defines how much external force the camera operator must apply to the camera (gimbal) to activate the manual adjustment of the camera's pointing angle. The threshold is adjustable by the camera operator.

If the external force is below the set threshold, the active stabilization controller interprets the external force merely as a disturbance and the method proceeds to step 1835 to correct for such a disturbance by executing a normal stabilization process for stabilizing a pointing direction of the camera in accordance with a commanded (desired) pointing angle. In some embodiments, the commanded pointing angle is stored at a sample and hold element and is the pointing angle of the camera, as measured by the IMU of the gimbal, at the time of completion of the last manual adjustment of the pointing angle. If no manual adjustment has yet been performed, the commanded pointing angle is the angle measured by the IMU at the time of the gimbal initialization. Further, in some embodiments, the commanded pointing angle may have been set by a remote operator using a remote controller, a joystick, or the like.

If the external force is above (exceeds) the set threshold, a camera's current pointing angle is measured, for example, by the IMU at step 1815. Due to the experienced external force, the measured pointing angle will differ from the commanded pointing angle in a direction of the force. At step 1820, the active stabilization controller sets the measured angle as the commanded pointing angle. As described, for example, with respect to FIG. 15, in some embodiments, a sample and hold element may receive a command to sample and hold the current pointing angle of the camera as the commanded pointing angle of the camera. By setting the commanded pointing angle to match the current pointing angle of the camera, the angle-based P loop is effectively disabled, thus disabling the stabilization process itself. In particular, because the angle-based loop receives as an input two angles (the current angle and the commanded angle) having identical values, the output of the loop is zero command tilt rate. That is, the camera is free to move in response to the force exercised by the camera operator, other than for a resistance provided by the rate-based PID control loop.

At step 1825, an integral accumulator of the rate-based control loop is optionally reset. The reset prevents the control error from accumulating over series of the control loop cycles and provides for a smoother return to the normal stabilization cycle (process) when the force is removed. It also reduces the ratchet effect that may be experienced by the camera (discussed in greater detail with respect to FIGS. 15 and 16). At step 1830, an update of the rate-based control loop is executed based on the command tilt rate outputted from the angle-based loop and on a tilt rate measured by the IMU. As the output of the angle-based loop is the zero command tilt rate (in other words, it commands non-movement), the rate-based loop provides some resistance to the force applied by the camera operator. Such resistance is felt by the camera operator and is similar to the feeling of friction, viscosity, or the like.

Upon executing the control loop update at step 1830, the method 1800 returns to step 1805 to determine (measure, compute, or otherwise acquire) the external force. That is, the steps 1805, 1810, 1820, 1825, and 1830 are repeated until the applied force falls below the set threshold. Repetition of these steps enables the user to manually adjust the pointing angle of the camera to a desired angle. When the force falls below the pre-set threshold, the commanded angle, which has been updated to the most recent current pointing angle of the camera at the last update loop as measured by the IMU, becomes the new pointing angle of the camera and is used by the stabilization process at step 1835. The stabilization process of step 1835 is generally similar to the stabilization process described with respect to FIG. 14.

Accordingly, the method 1800 enables the camera operator to manually adjust the pointing angle of the camera by consistently applying force to the camera (or gimbal), at a certain level and in a desired direction. When the camera operator completes the manual adjustment, the new pointing angle is remembered and maintained automatically by the active stabilization controller. In some embodiments, an integrating function representing a pseudo angular velocity is incorporated into the method 1800 to provide for the flywheel effect (to interpret the force as force acting upon inertia). In particular, step 1820 of setting the commanded angle will be modified to provide for the commanded angle updates in the manner discussed with respect to FIG. 15.

Figure 19:
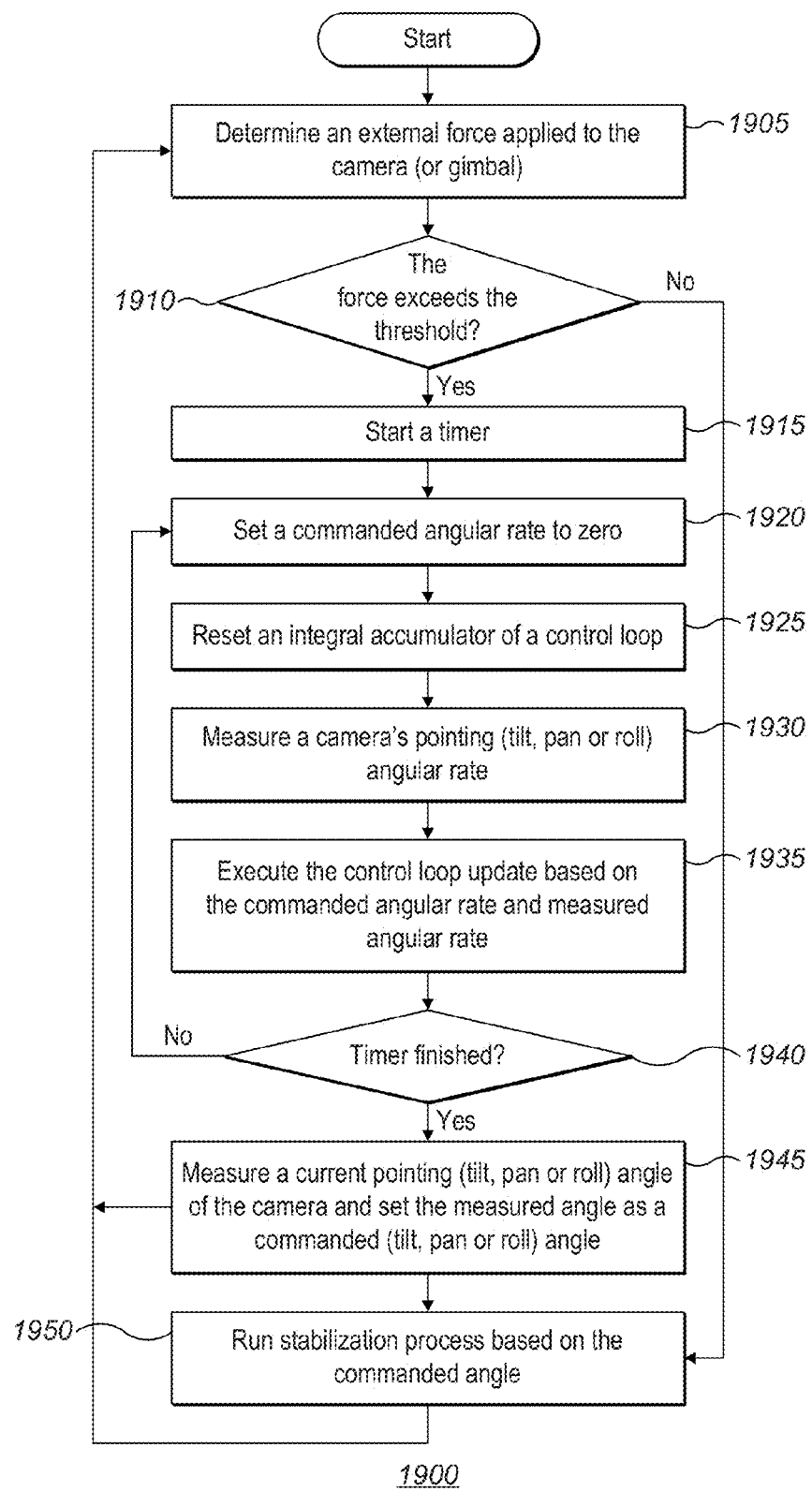
FIG. 19 illustrates a flowchart of a timer-based method for adjusting a pointing angle of an actively stabilized camera responsive to an externally applied force, according to some embodiments.

FIG. 19 depicts a method 1900 executed by an active stabilization controller, such as the active stabilization controller of FIG. 16, in accordance with some embodiments. Similar to the method 1800, the method 1900 starts with step 1905 of determining an external force applied to the camera (or the gimbal) and then proceeds to step 1910 to determine whether the detected force exceeds a pre-set threshold. If the determined external force is below the pre-set threshold, the method proceeds to step 1950 to execute a normal stabilization process. However, if the external force exceeds the pre-set threshold, a timer setting a delay period for enabling the camera operator to perform a manual adjustment of the camera's pointing angle is started at step 1915.

Step 1920 disables the outer angle-based stabilization loop and sets the commanded angular rate to zero. That is, while the timer is running, the control loop becomes a rate-based control loop only and its input is the zero command angular rate. At step 1925, an integral accumulator of the rate-based loop is reset, thus effectively setting the current control position at a zero error. The reset prevents the control error from accumulating over series of the control loop cycles and provides for a smoother return to the normal stabilization cycle (process) when the force is removed. It also reduces the ratchet effect that may be experienced by the camera (discussed in greater detail with respect to FIGS. 15 and 16).

The camera's pointing angular rate is measured at step 1930 and is used at step 1935 along the zero commanded tilt rate to execute the rate-based control loop update. The update allows manual adjustment (free movement) of the camera's pointing angle. However, its input of the zero commanded rate also ensures that the camera operator experiences some resistance to the adjustment. That is, the rate loop creates a feeling of a viscous movement.

At step 1940, it is determined whether the timer is still running or expired (finished). If the timer is still running, the method 1900 returns to step 1920 to repeat steps 1920, 1925, 1930, and 1935. In this manner, the camera operator is allowed to manually adjust the pointing angle of the camera, without fighting the stabilization process, which would otherwise have maintained the camera's pointing angle, bringing it back to the commanded pointing angle.

When the timer expires, a current pointing angle of the camera is measured at step 1945, for example, by the gimbal IMU, and set as the commanded angle, for example, to be used in the camera stabilization process at step 1950. The method 1900 then returns to step 1905, at which point, further manual adjustments of the camera's pointing angle are allowed only if the force applied to the camera or the gimbal exceeds the pre-set threshold.

Although not shown, a sample and hold element may sample the camera's current pointing angle from the IMU with each update of steps 1920 to 1940 and hold such measurement as the commanded pointing angle. In this manner, the sample and hold element would always have the most recent measurement of the camera's pointing angle, which is then locked when the method returns to the normal stabilization process at step 1950.

As discussed with respect to FIG. 16, in some embodiments, the timer may be reset after it expires to allow further adjustments if the manual adjustment process is still in progress. In such embodiments, step 1940 is followed by a step of determining whether the adjustment process is still in progress. Such a determination can be made, for example, by detecting whether the external force is continued to be applied the camera or the gimbal. In some embodiments, a determination as to whether the camera operator continues with the manual angle adjustment process is determined based on whether the IMU still detects angular motion, whether the torque reading is substantially zero (or below a certain threshold parameter), whether the IMU angle (tilt, pan) rate is substantially zero (or below a certain threshold parameter) or the like. Then, if the adjustment process is still in progress, even if the applied force is below the pre-set threshold, the method returns to step 1915 to re-start the timer to allow further adjustments of the camera's angle by the camera operator.

Accordingly, the method 1900 enables the camera operator to manually adjust the pointing angle of the camera by applying a force at a certain level to the camera (or the gimbal), and then continuously steering the pointing angle until a desired angle is reached. The timer enables the camera operator to adjust the pointing angle without hindrance, even if the applied force falls below the threshold, thus enabling more precise angle adjustments. When the camera operator completes the adjustment, the new pointing angle is remembered and maintained automatically by the active stabilization controller.

Figure 20:
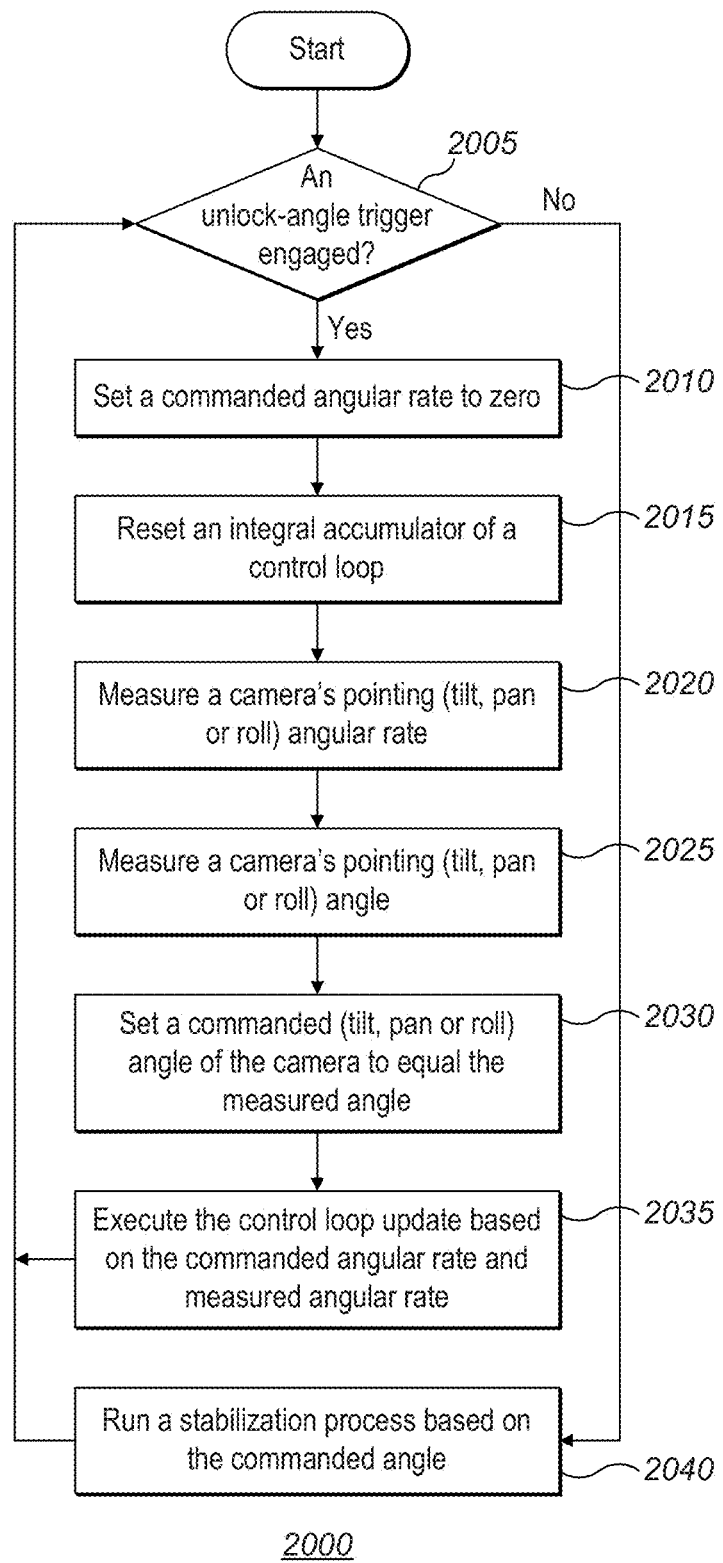
FIG. 20 illustrates a flowchart of a trigger-based method for adjusting a pointing angle of an actively stabilized camera, according to some embodiments.

FIG. 20 depicts a method 2000 executed by an active stabilization controller, such as the active stabilization controller of FIG. 17, in accordance with some embodiments. The method 2000 starts with step 2005 of determining whether a trigger (an unlock-angle trigger) is engaged. As discussed in greater detail with respect to FIG. 17, the unlock-angle trigger may be a button located on the camera or the gimbal that the camera operator needs to push, or push and hold, to unlock the pointing angle and trigger a switch of the active stabilization controller into the manual adjustment mode. Unlike the methods 1800 and 1900 of FIGS. 18 and 19 respectively, which require the external force, applied by the camera operator, to exceed a certain pre-set threshold, the method 2000 does not have such a requirement. Rather, the camera operator activates the manual adjustment mode by engaging the trigger, such as a button.

If the trigger is not engaged, the method proceeds to step 2040 at which the active stabilization controller executes a normal stabilization process for stabilizing a pointing direction of the camera in accordance with a commanded (desired) pointing angle. In some embodiments, the commanded pointing angle is stored at a sample and hold element and is the pointing angle of the camera, as measured by the IMU of the gimbal at the time of completion of the last manual adjustment of the pointing angle. If no manual adjustment process has yet been performed, the commanded pointing angle is the angle measured by the IMU at the time of the gimbal initialization or as set by the camera operator. Further, in some embodiments, the commanded pointing angle may have been set (or adjusted) by a remote operator using a remote controller, a joystick, or the like.

If the trigger is engaged, the method 2000 proceeds to step 2010, at which the outer angle update loop is disabled and a commanded angular rate is set to zero. That is, while the trigger is engaged, the control loop becomes a rate-based loop only and its input is the zero command angular rate. At step 2015, an integral accumulator of the rate loop is reset, thus effectively setting the current control position at a zero error. The integral accumulator reset prevents the control error from accumulating over a series of the control loop cycles and for a smoother return to the normal stabilization cycle (process) when the trigger is disengaged (released). It also reduces the ratchet effect that may be experienced by the camera.

The camera's pointing angular rate and pointing angle are measured at steps 2020 and 2025 respectively, for example, by the IMU of the active stabilization system. At step 2030, the active stabilization controller sets the measured angle as the commanded pointing angle and to be held as such, for example, by a sample and hold element. At step 2035, the rate-based control loop update is executed based on the measured angular rate along with the zero commanded angular rate. The rate loop allows the camera's pointing angle to move, thereby enabling the camera operator to adjust the camera's direction to a desired pointing angle. However, the input of the zero commanded angular rate also ensures that the camera operator experiences some resistance to the adjustment, creating a feeling of a viscous movement due to the rate loop being executed.

After completing the control loop update of step 2035, the method 2000 returns to step 2005 to determine whether the manual adjustment trigger remains engaged or has been released. In this manner, steps 2005 to 2035 are repeated while the manual adjustment trigger remains engaged. Repetition of these steps enables the camera operator to manually adjust the pointing angle of the camera to a desired angle. When the camera operator is satisfied with the selected angle, he or she disengages the trigger, for example by releasing the button or pushing the button to release it, allowing the method 2000 to return to the normal stabilization cycle. The active stabilization controller locks the most recent current pointing angle of the camera, acquired at step 2025, and sets it as the new (commanded) pointing angle of the camera. This new pointing angle of the camera is maintained by the means of the stabilization process of step 2040.

Accordingly, the method 2000 enables the camera operator to manually adjust the pointing angle of the camera by engaging the manual adjustment trigger and applying a force to the camera (or gimbal) while the trigger is engaged to achieve a desired angle. To complete the manual adjustment process, the camera operator releases the trigger and the new pointing angle is remembered and maintained automatically by the active stabilization controller.

Figure 21:
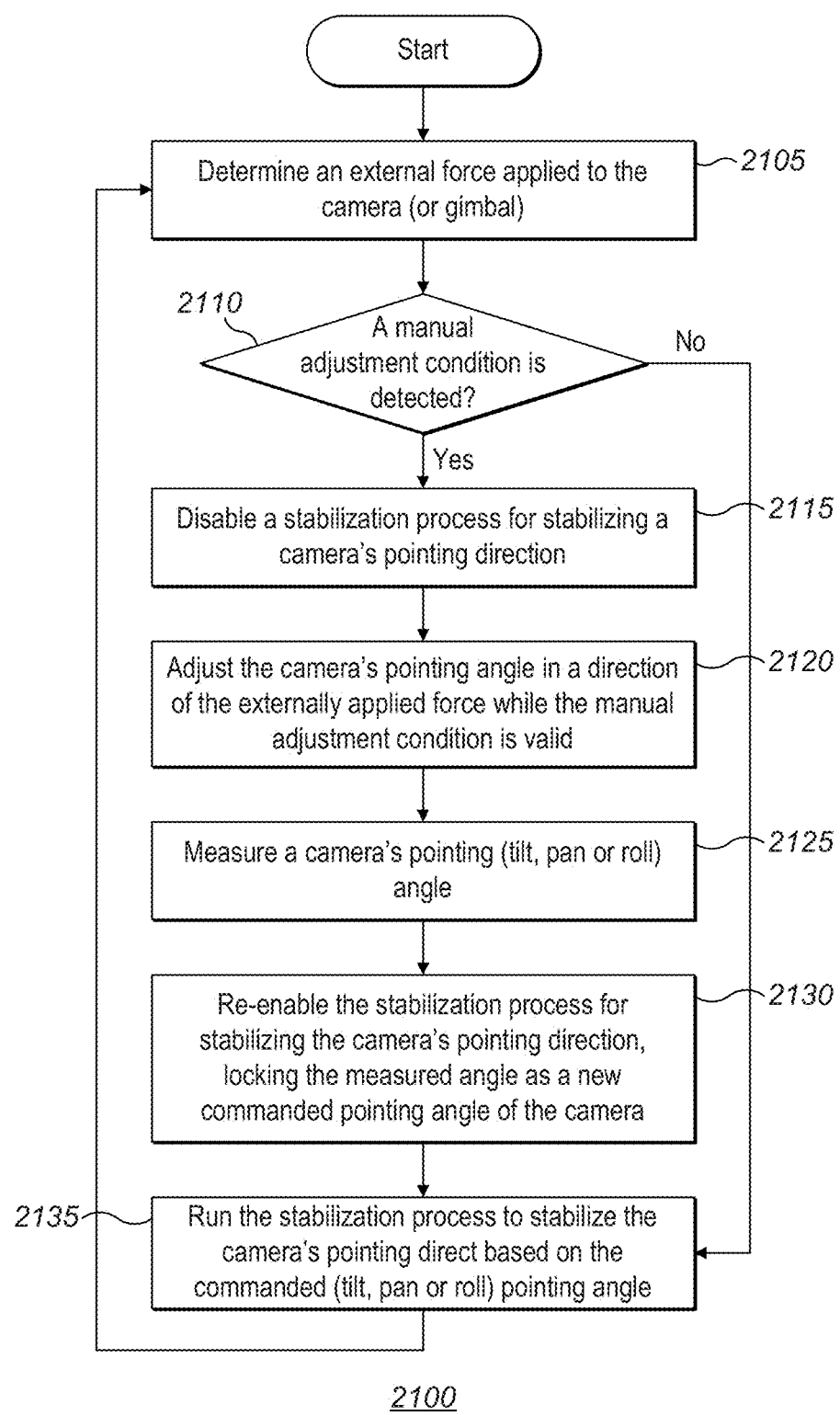
FIG. 21 illustrates a flowchart of another method for adjusting a pointing angle of an actively stabilized camera responsive to an externally applied force, according to some embodiments.

FIG. 21 depicts a method 2100 for enabling manual adjustment by the camera operator of an actively stabilized camera, in accordance with some embodiments. The method 2100 starts with step 2105 of determining an external force applied to the camera (or gimbal), such as a force applied by the camera operator wishing to adjust the pointing angle of the camera. The external force may be determined based on the control signal setting a torque to control movement of the gimbal's brushless DC motor for a respective axis or based on measurements acquired by a corresponding pressure sensor located on the camera (or gimbal).

At step 2110 a determination is made whether a manual adjustment condition is detected (valid, exists, or the like). If the manual adjustment condition is not detected, the method proceeds to step 2135, at which an active stabilization controller executes a normal stabilization process update for stabilizing a pointing direction of the camera in accordance with a commanded (desired) pointing angle.

Generally, the commanded pointing angle is the angle that is maintained by the active stabilization system, and may, for example, be stored at a sample and hold element of the system. Typically, in the context of the disclosed embodiments, the commanded pointing angle is a pointing angle of the camera, as measured by the IMU of the gimbal, at the time the pointing angle was last updated by the camera operator using the manual adjustment. If no manual adjustment has yet been performed, the commanded pointing angle is the angle measured by the IMU at the time of the gimbal initialization. However, the commanded pointing angle may also be set by a remote operator using a remote controller, a joystick, or the like or by the camera operator using a joystick on the gimbal.

If the manual adjustment condition is detected at step 2110, the active stabilization controller unlocks the camera's pointing angle by disabling the stabilization process update for stabilizing the camera's pointing direction (maintaining the commanded pointing angle) at step 2115 and switches into the manual adjustment mode. The manual adjustment condition indicates to the active stabilization controller that the stabilization process must be suspended to allow the camera operator to manually adjust the camera pointing angle. As discussed with respect to, for example, FIGS. 18 and 19, the external force being above a pre-set threshold and/or a running timer can be such a condition. Further, as discussed with respect to FIG. 20, the active stabilization system may include an unlock-angle trigger, such as a button or other actuator, engagement of which triggers the manual adjustment condition.

Step 2115 disables (suspends) the stabilization process update for stabilizing the camera's pointing direction (maintaining the commanded pointing angle). The stabilization process update is generally disabled for the duration of the manual adjustment condition, or in other words, until it expires, is revoked, is no longer valid, or otherwise ends. In some embodiments, the active stabilization update is disabled by disabling the angle-based control loop, for example, by using a switch, as discussed in greater detail with respect to FIGS. 19 and 20. In some embodiments, the commanded angle is set to match the current pointing angle of the camera, thus effectively causing the angle-based control loop to output the zero command angular rate and effectively disabling stabilization of the camera's pointing angle, as discussed in greater detail with respect to FIG. 18.

At step 2120, the camera's pointing angle is adjusted in a direction of the externally applied force. Essentially, step 2120 is a series of the control loop updates that enable adjustment of the camera's pointing angle in response to the force applied by the camera operator to the camera (or the gimbal), which are executed for the duration of the manual adjustment condition. The camera's pointing angle may be adjusted at step 2120 using methods described with respect to either of FIGS. 15 to 20. For example, the step 2120 may include a repetition of steps 1815 to 1830 of the method 1800, steps 1920 to 1935 or 1915 to 1940 of the method 1900, steps 2010 to 2035 of the method 2000, and/or the like.

When the manual adjustment condition is no longer valid, expires, or the like (for example, the trigger is released, the timer expired, the force falls below the threshold, motion falls below a threshold, or the like), the method 2100 proceeds to step 2125 to measure the camera's current pointing angle, for example, by the IMU. In some embodiments, this measurement would have been obtained at step 2120 as a part of the last executed control loop update. At step 2130, the method 2100 locks the measured angle as a new commanded pointing angle of the camera, for example, by updating a respective setting of a sample and hold element, and re-enables (restores) the active stabilization process. At step 2135, the active stabilization controller executes the stabilization process update in a normal manner, such as described with respect to FIG. 14, in accordance with the newly set commanded pointing angle. In this manner, the method 2100 enables the camera operator to manually adjust the pointing angle of the camera and, upon completion of the manual adjustment, locks the newly set pointing angle and maintains such an angle until the camera operator decides to further adjust the camera's pointing angle.

Each of the methods 1800, 1900, 2000, and 2100 can be performed for one or more of the tilt, pan, and roll axes in relation to the corresponding axis(es). Thus, a substantially downward or upward force will be resolved by the method 1800, 1900, 2000, or 2100 performed for a tilt axis, while a substantially left or right force will be resolved by the method 1800, 1900, 2000, or 2100 performed for a pan axis. For example, in some embodiments, the force is resolved by the gimbal control loops into the three actuators for each of the axes. That is, each axis is considered separately with its own threshold, allowing multiple axes to be adjusted at the same time. Whether the manual adjustment mode is activated for one, some, or all axes may depend on particular preferences of the camera operator, filming scenario, other modes being activated/deactivated in the active stabilization system, and the like. For example, for a helmet-mounted miniature camera gimbal, it may be more convenient for the user to be able to adjust the pointing angle of the camera in relation to all axes, while in the dual-operator mode, angle adjustment responsibilities may be split, and thus the manual adjustment mode may be activated only for one or two axes. That is, each of the methods 1800, 1900, 2000, and 2100 may be activated only for one of the axes. For example, by activating the method 1800, 1900, 2000, or 2100 for the tilt axis only, the camera operator is able to manually adjust the tilt angle of the camera, while the remote operator remains responsible for adjusting the pan, or vice versa.

The order of execution or performance of the operations in the embodiments illustrated and described herein is not essential, unless otherwise specified. Further, not all operations are necessarily performed. That is, the operations/steps described herein, for example, with respect to FIGS. 15 to 21 may be performed in any order, unless otherwise specified, and embodiments may include additional or fewer operations/steps than those disclosed herein. For example, a particular selected order and/or number of steps of methods may depend on camera's operator preferences and/or technical specifications of the gimbal stabilization system and/or camera and/or their components. It is further contemplated that executing or performing a particular operation/step before, contemporaneously with, or after another operation is in accordance with the described embodiments.

The methods and operations described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), flash memory cards, such as a micro-SD memory card, or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

It should be further understood that multiple parameters and settings discussed herein are adjustable by the camera operator and/or remote operator, at the time the active stabilization system is initialized and/or while in use, e.g., during filming. More specifically, in some embodiments, the remote operator may set up or adjust any of the parameters and settings discussed herein, using a remote controller, a computer (or other processing device) running a set-up/adjustment application, or any other device in communication with the active stabilization system and/or camera, via a remote link, wireless, such as radio (e.g., cellular, Wi-Fi, Bluetooth) or wired (e.g., fiber optics, cabling, or the like). The set-up/adjustment application provides its user (e.g., remote operator, camera operator, or other) with a graphical interface (GUI) that enables the user to select and adjust desired parameters and/or settings for the active stabilization system and/or camera, activate or deactivate different modes supported by the active stabilization system, including for selected or all axes (pan, tilt, roll), and/or camera, and the like. Corresponding commands (data, values) are transmitted to the active stabilization system and/or camera so as to update the respective parameters and settings there. That is, the user is able to control and adjust various parameters and settings of the camera and/or active stabilization system and/or activate/deactivate different modes remotely, using a specially designed application, installed on the device or web-based. The adjustable parameters and settings include, but are not limited to, camera's settings, e.g., focal settings, such as a focal length of the lens; distances, e.g., to the filming subject, height, or the like; various thresholds, scale factors, forcing functions, control loops settings, such as PID gains, maximum and/or minimum values, filters settings and bandwidth, settings for different axes, sensors' settings, storage settings, control rates, calibrations, offsets, and the like. The application may also inform the user about the system/camera's status and voice alarms when errors are detected.

Further, while the invention has been described in terms of various specific embodiments, the skilled person would recognize that the invention can be practiced with modification within the spirit and scope of the claims.

The invention claimed is:

1. A method for adjusting a pointing direction of a camera housed by an active stabilization system, the active stabilization system executing a stabilization process to stabilize the pointing direction of the camera, the method comprising:
   detecting an externally applied force;
   disabling an angle-based control loop of the stabilization process upon detecting a manual adjustment condition, the stabilization process further comprising a rate-based control loop configured to receive a commanded angular rate from the angle-based control loop;
   adjusting the pointing angle of the camera in a direction of the externally applied force;
   measuring a pointing angle of the camera; and
   re-enabling the angle-based control loop of the stabilization process to stabilize the pointing direction of the camera based on the measured pointing angle of the camera in response to detecting that the manual adjustment condition failed.

2. The method according to claim 1, wherein:
   the detecting the manual adjustment condition comprises detecting that an unlock-angle trigger is engaged; and
   the detecting that the manual adjustment condition failed comprises detecting that the unlock-angle trigger is released.

3. The method according to claim 1, wherein the externally applied force is experienced by at least one of the camera or the active stabilization system.

4. The method according to claim 1, wherein the externally applied force is detected based on at least one of a control signal issued by the active stabilization system for controlling movement of a motor of the active stabilization system or a measurement obtained by a pressure sensor located on one of the camera or the active stabilization system.

5. The method according to claim 1, wherein the disabling the angle-based control loop comprises one of:
   activating a switch to cause the stabilization process to bypass the angle-based control loop and provide a zero commanded angular rate to the rate-based control loop, or setting a commanded pointing angle to match a current pointing angle of the camera, wherein the angle-based control loop derives the commanded angular rate based on differences between the commanded pointing angle and the current pointing angle of the camera.

6. The method according to claim 1, wherein the adjusting step comprises:
measuring an angular rate of the camera; and
executing the rate-based control loop based on the measured angular rate and a zero commanded angular rate.

7. The method according to claim 6, further comprising resetting an integral accumulator of the rate-based control loop.

8. The method according to claim 1, wherein:
the detecting the manual adjustment condition comprises determining that the externally applied force exceeds a pre-set threshold; and
the detecting that the manual adjustment condition failed comprises determining that the externally applied force equals or is below the threshold.

9. The method according to claim 1, the method further comprising:
starting a timer for a pre-defined time period upon detecting the manual adjustment condition; and
adjusting the pointing angle of the camera in the direction of the externally applied force while the timer is running.

10. The method according to claim 9, wherein detecting the manual adjustment condition comprises determining that the externally applied force exceeds a pre-set threshold, the method further comprising:
detecting, upon expiration of the pre-defined time period, the externally applied force; and
restarting the timer if the externally applied force is detected.

11. The method according to claim 10, wherein:
if the externally applied force falls below the pre-set threshold while the timer is running, the pointing angle of the camera is adjusted in the direction of the externally applied force; and
the manual adjustment condition fails when the externally applied force equals or is below the threshold and the timer stops running.

12. The method according to claim 1 executed for one or more of a pan axis, a tilt axis, or a roll axis, wherein the externally applied force is detected in relation to the one or more axes.

13. The method according to claim 1, wherein as the pointing angle of the camera is being adjusted in the direction of the externally applied force, an adjustment rate of adjusting the pointing angle increases.

14. The method according to claim 1, further comprising:
continuing, in response to detecting that the manual adjustment condition failed, to adjust the pointing angle of the camera in the direction of the externally applied force, while reducing an adjustment rate of adjusting the pointing angle, until the adjustment rate reaches zero,
wherein the pointing angle of the camera is measured when the adjustment rate reaches zero.

15. A non-transitory computer-readable medium storing program instructions for causing a processor to perform a method for adjusting a pointing direction of a camera housed by an active stabilization system, the active stabilization system executing a stabilization process to stabilize the pointing direction of the camera, the method comprising:
detecting an externally applied force;
disabling an angle-based control loop of the stabilization process upon detecting a manual adjustment condition, the stabilization process further comprising a rate-based control loop configured to receive a commanded angular rate from the angle-based control loop;
adjusting the pointing angle of the camera in a direction of the externally applied force;
measuring a pointing angle of the camera; and
re-enabling the angle-based control loop of the stabilization process to stabilize the pointing direction of the camera based on the measured pointing angle of the camera in response to detecting that the detected manual adjustment condition failed.

16. An active stabilization system for adjusting a pointing direction of a camera housed by the system, the system executing a stabilization process to stabilize the pointing direction of the camera, the system comprising:
an inertial measurement unit configured to measure a pointing angle of the camera; and
an active stabilization controller configured to:
detect an externally applied force;
disable an angle-based control loop of the stabilization process upon detecting a manual adjustment condition, the stabilization process further comprising a rate-based control loop configured to receive a commanded angular rate from the angle-based control loop;
adjust the pointing angle of the camera in a direction of the externally applied force; and
re-enable the angle-based control loop of the stabilization process to stabilize the pointing direction of the camera based on the measured pointing angle of the camera in response to detecting that the detected manual adjustment condition failed.

17. An active stabilization system according to claim 16, wherein the active stabilization controller is configured to control the pointing angle in relation to at least one of a pan axis, a tilt axis, or a roll axis.

18. An active stabilization system according to claim 16, further configured to enable a camera operator to pre-select at least one of the pan, tilt, or roll axes for which a manual adjustment of the pointing angle of the camera is enabled.

19. An active stabilization system according to claim 18, further configured to enable a camera operator to adjust at least one of a threshold defining a minimum external force that enables the manual adjustment of the pointing angle or a time period for the manual adjustment, once the externally applied force exceeds the threshold.

20. The method according to claim 1, wherein the control signal issued by the active stabilization system sets a reaction torque for the motor.

* * * * *

UNITED STATES PATENT AND TRADEMARK OFFICE
CERTIFICATE OF CORRECTION

PATENT NO.         : 8,908,090 B2                                           Page 1 of 1
APPLICATION NO.    : 14/214517
DATED              : December 9, 2014
INVENTOR(S)        : Steve Webb It is certified that error appears in the above-identified patent and that said Letters Patent is hereby corrected as shown below:

In the claims

• Claim 15, Line 19, "detecting that the detected manual adjustment" should read --detecting that the manual adjustment--.

• Claim 16, Line 20, "detecting that the detected manual adjustment" should read --detecting that the manual adjustment--.

Signed and Sealed this
First Day of December, 2015

Michelle K. Lee
*Director of the United States Patent and Trademark Office*